US012811203B2

(12) United States Patent
Hatanaka et al.

(10) Patent No.: US 12,811,203 B2
(45) Date of Patent: Nov. 24, 2026

(54) SECONDARY BATTERY ELECTRODE ADDITIVE

(71) Applicant: NISSAN CHEMICAL CORPORATION, Tokyo (JP)

(72) Inventors: Tatsuya Hatanaka, Funabashi (JP); Yasushi Sakaida, Funabashi (JP); Takahiro Kaseyama, Funabashi (JP); Mari Yajima, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 717 days.

(21) Appl. No.: 18/035,702

(22) PCT Filed: Nov. 16, 2021

(86) PCT No.: PCT/JP2021/041998
§ 371 (c)(1),
(2) Date: May 5, 2023

(87) PCT Pub. No.: WO2022/107740
PCT Pub. Date: May 27, 2022

(65) Prior Publication Data

US 2023/0420749 A1 Dec. 28, 2023

(30) Foreign Application Priority Data

Nov. 18, 2020 (JP) ................................ 2020-191313
Jan. 25, 2021 (JP) ................................ 2021-009442

(51) Int. Cl.

| | |
|---|---|
| ***H01M 10/42*** | (2006.01) |
| ***C07F 5/02*** | (2006.01) |
| ***C07F 5/04*** | (2006.01) |
| ***C08F 116/06*** | (2006.01) |
| ***H01M 4/131*** | (2010.01) |
| ***H01M 4/133*** | (2010.01) |
| ***H01M 4/134*** | (2010.01) |
| ***H01M 4/36*** | (2006.01) |

(Continued)

(52) U.S. Cl.
CPC ......... *H01M 10/4235* (2013.01); *C07F 5/025* (2013.01); *C07F 5/04* (2013.01); *C08F 116/06* (2013.01); *H01M 4/131* (2013.01); *H01M 4/133* (2013.01); *H01M 4/134* (2013.01); *H01M 4/364* (2013.01); *H01M 4/366* (2013.01); *H01M 4/483* (2013.01); *H01M 4/505* (2013.01); *H01M 4/525* (2013.01); *H01M 4/587* (2013.01); *H01M 4/628* (2013.01); *H01M 10/0525* (2013.01); *C08F 2810/00* (2013.01); *H01M 2004/027* (2013.01); *H01M 2004/028* (2013.01)

(58) Field of Classification Search
CPC .. H01M 10/4235; H01M 4/131; H01M 4/133; H01M 4/134; H01M 4/364; H01M 4/366; H01M 4/483; H01M 4/505; H01M 4/525; H01M 4/587; H01M 4/628; H01M 2004/027; H01M 2004/028; C07F 5/025; C07F 5/04; C08F 116/06; C08F 2810/00
See application file for complete search history.

(56) References Cited

U.S. PATENT DOCUMENTS 6,156,459 A * 12/2000 Negoro ............ H01M 10/0567 429/231.95
8,207,337 B2 * 6/2012 Miyaura ................ C07F 5/025 549/213
2009/0278082 A1 11/2009 Takebayashi et al.
2015/0349344 A1 * 12/2015 Shelekhin ............ H01M 4/625 252/182.1

(Continued)

FOREIGN PATENT DOCUMENTS

CN 102790237 A * 11/2012
CN 107925059 A 4/2018

(Continued)

OTHER PUBLICATIONS

Yamamoto et al Angew. Chem. Int. Ed. 2008, 47, 928 -93 (Year: 2008).*

(Continued)

*Primary Examiner* — Alexander Usyatinsky
(74) *Attorney, Agent, or Firm* — Birch, Stewart, Kolasch & Birch, LLP

(57) ABSTRACT

Provided is a secondary battery electrode additive with which an active material can be coated without heat treatment that is performed at a high temperature for a long period of time, an alkaline component can be neutralized, and the decomposition of an electrolytic solution can be suppressed. For example, provided is a secondary battery electrode additive comprising a boronic acid derivative represented by formula (5).

(5)

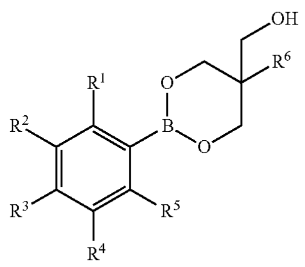

(In the formula, $R^1$-$R^5$ each independently represent a hydrogen atom, an alkyl group, an ester group, a glycol chain, an alkoxy group, or a hydroxy group, and $R^6$ represents a hydrogen atom, a methyl group, or an ethyl group).

29 Claims, No Drawings

(51) Int. Cl.

| | |
|---|---|
| ***H01M 4/48*** | (2010.01) |
| ***H01M 4/505*** | (2010.01) |
| ***H01M 4/525*** | (2010.01) |
| ***H01M 4/587*** | (2010.01) |
| ***H01M 4/62*** | (2006.01) |
| ***H01M 10/0525*** | (2010.01) |
| *H01M 4/02* | (2006.01) |

(56) References Cited

U.S. PATENT DOCUMENTS

| | | | | |
|---|---|---|---|---|
| 2016/0013476 | A1 | 1/2016 | Oh et al. | |
| 2017/0365855 | A1* | 12/2017 | Ryu | H01M 4/366 |
| 2018/0226637 | A1 | 8/2018 | Koike | |
| 2020/0220175 | A1* | 7/2020 | Asaba | H01M 4/1391 |

FOREIGN PATENT DOCUMENTS

| | | | |
|---|---|---|---|
| JP | 11-3728 | A | 1/1999 |
| JP | 2006-286240 | A | 10/2006 |
| JP | 5418626 | B2 | 2/2014 |
| JP | 6165162 | B2 | 7/2017 |
| JP | 6284542 | B2 | 2/2018 |
| JP | 6429172 | B2 | 11/2018 |

OTHER PUBLICATIONS

By Washburn et al. Organic Syntheses, Coll. vol. 4, p. 68 (1963); vol. 39, p. 3 (1959) (Year: 1963).*

JPO decision to grant a patent for JP 2022563755 (Year: 2026).*

The decision of JPO to grant a Patent for Application JP 2022563755 (Year: 2026).*

International Search Report for PCT/JP2021/041998 mailed on Dec. 21, 2021.

Written Opinion of the International Searching Authority for PCT/JP2021/041998 mailed on Dec. 21, 2021.

Zuo et al., "Recent progress in surface coating of cathode materials for lithium ion secondary batteries", Journal of Alloys and Compounds, 2017, vol. 706, pp. 24-40.

* cited by examiner

SECONDARY BATTERY ELECTRODE ADDITIVE

TECHNICAL FIELD

The present invention relates to a secondary battery electrode additive.

BACKGROUND ART

Lithium ion secondary batteries are secondary batteries that are currently most actively developed because they have high energy density and high voltage and are free of memory effect during charge and discharge. Lithium ion secondary batteries are required to have lower resistance, a longer life, high capacity, safety and higher economic efficiency with expansion of their application and usage.

Lithium ion secondary batteries have a problem that repetition of charge and discharge leads to degradation. Various factors have been reported as a mechanism of deterioration, and main reasons thereof include deterioration of an active material due to decomposition of moisture and an electrolyte solution remaining in a small amount in a battery, an increase in internal resistance due to formation of a decomposition product of the electrolyte solution, and generation of an active material isolated by cracks generated in an electrode composite layer.

For solving these problems, Non-Patent Document 1 discloses a technique in which a surface of a positive active material is covered with an oxide of metal such as Mg, Al, Ti, Sn, Si or Cu, a phosphorus-based compound, carbon, or the like, but it cannot be said that the problem of life degradation and the problem of gas generation due to decomposition of an electrolyte or the like during charge and discharge can be sufficiently solved.

As positive active materials for lithium ion secondary batteries which enable a battery voltage of about 4 V to be obtained, inorganic compounds such as transition metal oxides containing an alkali metal and transition metal chalcogen are known. Among them, high-nickel positive active materials typified by $LixNiO_2$ are attractive positive electrode materials with high discharge capacity. However, on a surface of a high-nickel positive active material, there exist a large amount of impurities such as residues of raw materials, LiOH formed by proton exchange reaction with moisture, and $Li_2CO_3$ generated by reaction of the LiOH with carbon dioxide gas in the air.

In particular, LiOH, which is an alkali component, causes gelling of slurry in kneading of a composition containing a positive active material, polyvinylidene fluoride (PVdF) as a binder and N-methyl-2-pyrrolidone (NMP) as a solvent or in application of the kneaded composition in a step of preparing a positive electrode. In addition, the alkali component may not only increase the resistance of a battery by corroding aluminum generally used as a current collecting foil of a positive electrode, but also react with an electrolyte solution in the battery, leading to an increase in resistance of the battery or deterioration of the life.

On the other hand, $Li_2CO_3$ may be decomposed by charge and discharge to generate $CO_2$ gas and $CO_3$ gas, with the gas components increasing pressure inside the battery, resulting in swelling of the battery or deterioration of the cycle life. In addition, the battery may be broken by an increase in internal pressure from the generated gas.

Further, the high-nickel positive active material has low electrode volume density because of the composition and shape of the active material, and is poor in electrode winding properties. In the form of powder, the high-nickel positive active material powder has lower true density as compared to $Li_xCoO_2$, so that the decreased electrode volume density cannot be improved by the composition. It is possible to produce a cylindrical battery, but due to the poor electrode winding properties, it is difficult to produce a flat battery used in a mobile phone device or the like because bending at the time of folding the electrode is hard, so that the electrode is broken or cut at the time of folding the electrode by winding or during molding by a press after winding. For solving these problems, a method is generally employed in which the thickness of the electrode foil is increased to enhance strength or the volume density of the positive active material applied to the electrode foil is reduced. However, in such methods, the amount of the positive active material contained per battery volume decreases, and consequently, sufficient capacity cannot be obtained.

For solving the above-described problems of a lithium ion secondary battery using a high-nickel positive active material, Patent Document 1 discloses a method in which the positive active material is treated with fluorine gas to fix remaining LiOH as LiF, so that gelling can be prevented, and gas generation is suppressed. However, fluorine gas is highly toxic and difficult to handle, and LiF generated as a by-product increases the internal resistance of the battery, and the positive active material is corroded by fluorine gas, leading to a decrease in capacity. Further, there is a problem that remaining fluorine is likely to react with a very small amount of moisture present in the active material or the electrolyte solution to generate hydrogen fluoride, resulting in occurrence of cycle degradation.

Patent Document 2 indicates that by adding phosphorous acid ($H_3PO_3$) into the electrode, the distributions of a binder and a conduction aid in the positive electrode can be changed to enhance the winding properties of the electrode. This method is expected to suppress degradation by neutralizing an alkali component, but has a problem that lithium phosphate generated as a by-product increases the internal resistance of the battery. There is also a problem that since lithium phosphate is an inorganic salt, it is poor in ability to cover the active material, and thus the active material still comes into contact with the electrolyte solution, so that the electrolyte solution is decomposed, resulting in degradation of the battery.

Patent Document 3 discloses a method in which a boron-based compound such as an oxide of boron or an oxoacid is mixed with a lithium transition metal oxide, and the mixture is heat-treated to coat the surface of the lithium transition metal oxide. However, this method has a problem that the process load is large because heat treatment at a high temperature is required, and an action of suppressing decomposition of an electrolyte solution cannot be sufficiently obtained.

Patent Document 4 discloses a method in which a coating layer of an organic phosphate containing triphenyl phosphate is formed on a surface of a positive active material to suppress an oxidative decomposition reaction between the positive active material and an electrolyte solution. However, this method also has a problem that the process load is large because it is necessary to perform heat treatment at a high temperature for a long time. There is also a problem that the action of neutralizing an alkali component is insufficient, and therefore an effect of reducing the resistance of the battery cannot be obtained.

Patent Document 5 indicates that a compound having a C—N bond and a polymerizable unsaturated bond and composed of a salt of a monovalent metal cation and a boron-based compound anion can function as an electrode protective film forming agent to provide an electrode or an electrolyte solution for a secondary battery which is excellent in output characteristics and long-term cycle characteristics and has low electrode resistance. In this technique, a polymerized film is formed on a surface of an active material of an electrode when voltage is applied to the obtained battery or the like, and it is possible to improve charge and discharge cycle characteristics and output characteristics and reduce the electrode resistance by the action of the polymerized film. However, there is a problem that the compound is low in yield in synthesis because of the complicated structure, and poor in practicality because of high cost. There is also a problem that since the compound does not have a function of neutralizing alkali impurities contained in the positive active material which may degrade the battery, an effect of reducing the resistance of the battery cannot be sufficiently obtained.

Patent Document 6 indicates that by forming a protective film containing a boron-based anion receptor and a block copolymer, so that the reactivity of anions of a lithium salt is suppressed by the anion receptor, deterioration of a battery can be suppressed and ion conductivity between a positive electrode and an electrolyte can be improved. However, there is a problem that the anion receptor is poor in action of neutralizing an alkali component, so that a sufficient effect for suppressing degradation cannot be obtained. There is also a problem that since the protective layer is thick, energy density decreases, and the number of holes in the electrode decreases, leading to deterioration of lithium ion diffusibility.

PRIOR ART DOCUMENTS

Patent Documents

Patent Document 1: JP-A 2006-286240
Patent Document 2: JP No. 5418626
Patent Document 3: JP No. 6284542
Patent Document 4: JP No. 6429172
Patent Document 5: JP No. 6165162
Patent Document 6: US 2017/0365855

Non-Patent Documents

Non-Patent Document 1: Journal of Alloys and Compounds 706 (2017) 24-40

SUMMARY OF INVENTION

Technical Problem

The present invention has been made in view of these circumstances, and an object of the present invention is to provide a secondary battery electrode additive which is capable of coating an active material without being heat-treated at a high temperature and for a long time, and can neutralize an alkali component and suppress decomposition of an electrolyte solution.

Solution to Problem

The present inventors have intensively conducted studies for achieving the above-described object, and resultantly found that a secondary battery electrode additive including a boronic acid derivative is capable of coating an active material without being heat-treated at a high temperature and for a long time, and can neutralize an alkali component and suppress decomposition of an electrolyte solution, leading to completion of the present invention.

That is, the present invention provides the following secondary battery electrode additive.

1. A secondary battery electrode additive including a boronic acid derivative.
2. The secondary battery electrode additive according to 1, wherein the boronic acid derivative is a reaction product of an arylboronic acid of the following formula (1) and a reactive compound having two or more reactive groups of at least one type selected from the group consisting of a hydroxyl group, a carbonyl group, an isocyanate group, and an amino group:

[Chem. 1]

(1)

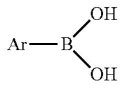

wherein Ar represents an aryl group optionally having a substituent or a heteroaryl group optionally having a substituent.

3. The secondary battery electrode additive according to 2, wherein Ar is a phenyl group optionally having a substituent.
4. The secondary battery electrode additive according to 2 or 3, wherein the arylboronic acid has the following formula (2):

[Chem. 2]

(2)

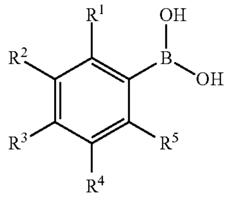

wherein $R^1$ to $R^5$ each independently represent a hydrogen atom, an alkyl group, an ester group, a glycol chain, an alkoxy group, or a hydroxyl group.

5. The secondary battery electrode additive according to any one of 2 to 4, wherein the reactive compound is at least one selected from the group consisting of trimethylolethane, trimethylolethane, trimethylolpropane, glycerin, mannitol, pentaerythritol, dipentaerythritol, diaminonaphthalene, phenylenediamine, N-methyliminodiacetic acid, oxalic acid, fumaric acid, phthalic acid, succinic acid, citric acid, isocitric acid, oxalosuccinic acid, oxaloacetic acid, aconitic acid, p-toluenesulfonyl isocyanate, chlorosulfonyl isocyanate, polyvinyl alcohol and derivatives thereof, and polyvinyl alcohol copolymers and derivatives thereof.
6. The secondary battery electrode additive according to any one of 2 to 5, wherein the reactive compound has three or more of the reactive groups.
7. The secondary battery electrode additive according to 6, wherein the reactive compound has three or more hydroxyl groups.

8. The secondary battery electrode additive according to 2, wherein the boronic acid derivative has the following formula (3) or contains a repeating unit of the following formula (4):

[Chem. 3]

(3)

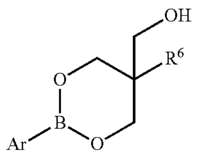

(4)

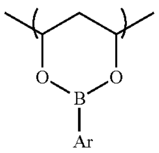

wherein Ar represents the same meaning as described above, and $R^6$ represents a hydrogen atom, a methyl group, or an ethyl group.

9. The secondary battery electrode additive according to any one of 4 to 7, wherein the boronic acid derivative has the following formula (5) or contains a repeating unit of the following formula (6):

[Chem. 4]

(5)

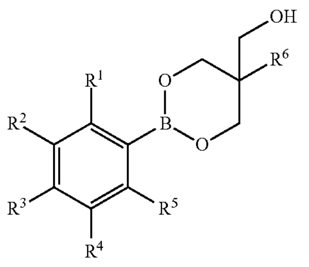

(6)

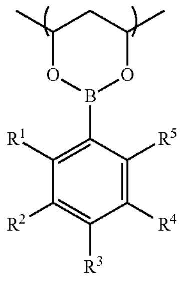

wherein $R^1$ to $R^5$ represent the same meaning as described above, and $R^6$ represents a hydrogen atom, a methyl group, or an ethyl group.

10. The secondary battery electrode additive according to any one of 4 to 7, wherein the boronic acid derivative has the following formula (7):

[Chem. 5]

(7)

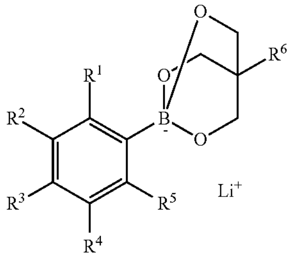

wherein $R^1$ to $R^5$ represent the same meaning as described above, and $R^6$ represents a hydrogen atom, a methyl group, or an ethyl group.

11. An electrode composition including the secondary battery electrode additive according to any one of 1 to 10, and an active material.

12. The electrode composition according to 11, further including a second additive that is different from the secondary battery electrode additive according to any one of 1 to 10.

13. The electrode composition according to 12, wherein the second additive is at least one selected from the group consisting of water, a hydroxyl group-containing compound, and a compound containing a nitrogen atom and a carbonyl structure.

14. The electrode composition according to 12 or 13, wherein the second additive is at least one selected from the group consisting of polyvinyl pyrrolidone, polyvinyl alcohol and derivatives thereof, and polyvinyl alcohol copolymers and derivatives thereof.

15. The electrode composition according to any one of 11 to 14, wherein the active material is an oxide containing Li and Ni, and the electrode composition is a positive electrode composition.

16. The electrode composition according to 15, wherein the active material is a positive electrode composition of $Li_aNi_{(1-x-y)}Co_xM^1_yM^2_zX_wO_2$ ($1.00 \leq a \leq 1.50$, $0.00 \leq x \leq 0.50$, $0 \leq y \leq 0.50$, $0.000 \leq z \leq 0.020$, $0.000 \leq w \leq 0.020$, wherein $M^1$ is at least one selected from the group consisting of Mn and Al, and $M^2$ is at least one selected from the group consisting of Zr, Ti, Mg, W, and V).

17. The electrode composition according to any one of 11 to 16, wherein the secondary battery electrode additive is contained at 0.01 to 10.0 wt %.

18. The electrode composition according to any one of 11 to 14, wherein the active material is at least one selected from the group consisting of graphite, Si, SiO, lithium titanium oxide (LTO), and metal Li, and the electrode composition is a negative electrode composition.

19. The electrode composition according to 18, wherein the secondary battery electrode additive is contained at 0.02 to 10.0 wt %.

20. A secondary battery electrode including: a current collecting substrate; and an active material layer formed on at least one surface of the current collecting substrate, wherein the active material layer is formed of the electrode composition according to any one of 11 to 14.

21. A secondary battery positive electrode including: a current collecting substrate; and an active material layer formed on at least one surface of the current collecting substrate, wherein the active material layer is formed of the electrode composition according to any one of 15 to 17.

22. The secondary battery positive electrode according to 21, wherein in a secondary battery electrode after charge and discharge, an intensity ratio between an intensity of a C—F peak (686±1.25 eV) and an intensity of a LiF peak (683.5±1.25 eV) ([C—F]/[LiF]), which is determined by XPS measurement (the C—C-derived peak of C1s is standardized as 284 eV), is 3.0 or more.

23. A secondary battery negative electrode including: a current collecting substrate; and an active material layer formed on at least one surface of the current collecting substrate, wherein the active material layer is formed of the electrode composition according to 18 or 19.

24. A secondary battery including at least one electrode selected from the group consisting of the secondary battery electrode according to 20, the secondary battery positive electrode according to 21 or 22, and the secondary battery negative electrode according to 23.

25. The secondary battery according to 24, which is a lithium ion secondary battery.

26. The secondary battery according to 24, which is an all-solid-state battery.

27. A method for producing an electrode composition containing the secondary battery electrode additive according to any one of 1 to 10 and an active material, wherein a maximum temperature during preparation of the composition is 60 to 200 °C.

28. The method for producing an electrode composition according to 27, wherein the maximum temperature is 60 to 150 °C.

29. The method for producing an electrode composition according to 28, wherein the maximum temperature is 60 to 125 °C.

Advantageous Effects of Invention

A secondary battery electrode additive including a boronic acid derivative according to the present invention is capable of coating an active material without being heat-treated at a high temperature and for a long time, and can increase adhesion strength at an interface between an electrode and a current collector, which is important in electrode winding properties. Further, the secondary battery electrode additive can reduce resistance and suppress degradation by enhancing the dispersibility of a binder resin and a conductive carbon material in the electrode. The reason why these effects are obtained is not clear, but is presumed as follows. For example, it is presumed that the alkali component on the surface of the active material can be neutralized, and thus corrosion of the aluminum foil by the alkali component is suppressed; and the boronic acid derivative acts as a protective layer on the surface of the active material to suppress contact between the electrolytic solution and the active material, so that decomposition of the electrolyte solution is suppressed, whereby an increase in resistance and degradation of capacity due to charge and discharge can be suppressed, and elution of metal from the active material is suppressed.

DESCRIPTION OF EMBODIMENTS

A secondary battery electrode additive (hereinafter, sometimes referred to simply as an additive) according to the present invention includes a boronic acid derivative.

In the present invention, the boronic acid derivative is not particularly limited, and is preferably a reaction product of an arylboronic acid of the following formula (1) and a reactive compound having two or more reactive groups of at least one type selected from the group consisting of a hydroxyl group, a carbonyl group, an isocyanate group, and an amino group.

[Chem. 6]

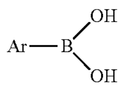

(1)

In the formula, Ar represents an aryl group optionally having a substituent or a heteroaryl group optionally having a substituent.

Examples of the aryl group include an aryl group having 6 to 20 carbon atoms. Specific examples thereof include phenyl, tolyl, 1-naphthyl, 2-naphthyl, 1-anthryl, 2-anthryl, 9-anthryl, 1-phenanthryl, 2-phenanthryl, 3-phenanthryl, 4-phenanthryl, 9-phenanthryl, and biphenyl groups, and a phenyl group is preferable.

Examples of the substituent include an alkyl group having 1 to 20 carbon atoms, an ester group, a glycol chain, an alkoxy group having 1 to 20 carbon atoms, and a hydroxyl group.

The alkyl group having 1 to 20 carbon atoms may be linear, branched or cyclic, and specific examples thereof include methyl, ethyl, n-propyl, isopropyl, n-butyl, isobutyl, s-butyl, t-butyl, n-pentyl, cyclopentyl, n-hexyl, cyclohexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, and n-eicosanyl. An alkyl group having 1 to 18 carbon atoms is preferable, and an alkyl group having 1 to 8 carbon atoms is more preferable.

The alkyl group bonded to the oxygen atom of the alkoxy group having 1 to 20 carbon atoms may be linear, branched, or cyclic, and specific examples of the alkoxy group include methoxy, ethoxy, n-propoxy, i-propoxy, n-butoxy, i-butoxy, i-butoxy, s-butoxy, t-butoxy, n-pentyloxy, i-pentyloxy, 2-methylbutoxy, 1,1-dimethylpropoxy, neopentyloxy, 3,3-dimethylbutoxy, 1-ethylpropoxy, n-hexyloxy, benzyloxy, naphthylmethyloxy, 1-phenylethyloxy, 2-phenylethyloxy, 2-naphthylethyloxy, and 3,3-diphenylpropoxy groups. An alkoxy group having 1 to 18 carbon atoms is preferable, and an alkoxy group having 1 to 8 carbon atoms is more preferable.

Examples of the heteroaryl group include a heteroaryl group having 2 to 20 carbon atoms. Specific examples thereof include oxygen-containing heteroaryl groups such as 2-furanyl, 3-furanyl, 2-oxazolyl, 4-oxazolyl, 5-oxazolyl, 3-isoxazolyl, 4-isoxazolyl and 5-isoxazolyl, groups; sulfur-containing heteroaryl groups such as 2-thienyl, 3-thienyl, 2-thiazolyl, 4-thiazolyl, 5-thiazolyl, 3-isothiazolyl, 4-isothiazolyl and 5-isothiazolyl groups; and nitrogen-containing heteroaryl groups such as 2-imidazolyl, 4-imidazolyl, 2-pyridyl, 3-pyridyl, 4-pyridyl, 2-pyrazinyl, 3-pyrazinyl, 5-pyrazinyl, 6-pyrazinyl, 2-pyrimidyl, 4-pyrimidyl, 5-pyrimidyl, 6-pyrimidyl, 3-pyridazyl, 4-pyridazyl, 5-pyridazyl, 6-pyridazyl, 1,2,3-triazin-4-yl, 1,2,3-triazin-5-yl, 1,2,4-triazin-3-yl, 1,2,4-triazin-5-yl, 1,2,4-triazin-6-yl, 1,3,5-triazin-2-yl, 1,2,4,5-tetrazin-3-yl, 1,2,3,4-tetrazin-5-yl, 2-quinolinyl, 3-quinolinyl, 4-quinolinyl, 5-quinolinyl, 6-quinolinyl, 7-quinolinyl, 8-quinolinyl, 1-isoquinolinyl, 3-isoquinolinyl, 4-isoquinolinyl, 5-isoquinolinyl, 6-isoquinolinyl, 7-isoquinolinyl, 8-isoquinolinyl, 2-quinoxanyl, 5-quinoxanyl, 6-quinoxanyl, 2-quinazolinyl, 4-quinazolinyl, 5-quinazolinyl, 6-quinazolinyl, 7-quinazolinyl, 8-quinazolinyl, 3-cinnolinyl, 4-cinnolinyl, 5-cinnolinyl, 6-cinnolinyl, 7-cinnolinyl, and a 8-cinnolinyl groups.

Examples of the substituent of the heteroaryl group include the same substituents as those exemplified for the aryl group.

Ar is preferably a phenyl group optionally having a substituent, more preferably a phenyl group having no substituent or having an alkyl group having 1 to 20 carbon atoms, still more preferably a phenyl group having no substituent or having a methyl group.

The arylboronic acid is preferably an arylboronic acid of the following formula (2).

[Chem. 7]

(2)

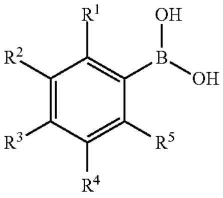

wherein $R^1$ to $R^5$ each independently represent a hydrogen atom, an alkyl group, an ester group, a glycol chain, an alkoxy group, or a hydroxyl group.

$R^1$ to $R^5$ are each preferably a hydrogen atom or an alkyl group, more preferably a hydrogen atom or an alkyl group having 1 to 20 carbon atoms, still more preferably a hydrogen atom or a methyl group, even more preferably a hydrogen atom.

The reactive compound is preferably a compound having three or more of the reactive groups, more preferably a compound having three or more hydroxyl groups.

Specific examples of the reactive compound include trimethylolethane, trimethylolethane, trimethylolpropane, glycerin, mannitol, pentaerythritol, dipentaerythritol, diaminonaphthalene, phenylenediamine, N-methyliminodiacetic acid, oxalic acid, fumaric acid, phthalic acid, succinic acid, citric acid, isocitric acid, oxalosuccinic acid, oxaloacetic acid, aconitic acid, polyvinyl alcohol and derivatives thereof, polyvinyl alcohol copolymers and derivatives thereof, p-toluenesulfonyl isocyanate, and chlorosulfonyl isocyanate. In the present invention, trimethylolethane, mannitol, N-methyliminodiacetic acid, polyvinyl alcohol and derivatives thereof, and p-toluenesulfonyl isocyanate are preferable. These reactive compounds can be used singly or in combination of two or more thereof.

It is considered that when a compound having three or more hydroxyl groups is used as the reactive compound, i.e. when the boronic acid derivative has a triolborate structure, the reactive compound reacts with LiOH and $Li_2CO_3$ through a cyclization reaction even at a low temperature, so that impurities are easily decomposed. Consequently, not only the resistance of the battery can be reduced and an increase in resistance and the capacity degradation due to charge and discharge can be suppressed, but also the generation of gas in the battery can be suppressed, so that improvement of safety is expected.

In addition, since anionization by a cyclization reaction of a triolborate structure enables interaction with lithium ions, the protective film formed by triol boronate is also expected to exhibit lithium transportability.

Further, triol boronate is expected to function as a Lewis acid, and therefore can perform Lewis acid-base interaction with an electrolyte solution such as ethylene carbonate, so that it is expected that resistance can be reduced by accelerating desolvation of lithium ions at an interface of the active material. In addition, it is considered that since the triol boronate can perform acid-base interaction like the anion of a lithium salt, and therefore the anion can be stabilized to suppress reactivity, so that it is possible to suppress an increase in resistance and deterioration of capacity due to charge and discharge.

Examples of the boronic acid derivative obtained by reacting the arylboronic acid with the reactive compound include boronic acid derivatives of the following formula (3) (hereinafter, sometimes referred to as "monomolecular type") and boronic acid derivatives containing a repeating unit of the following formula (4) (hereinafter, sometimes referred to as "polymer type").

[Chem. 8]

(3)

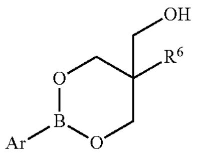

(4)

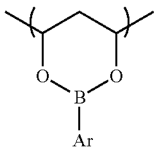

wherein Ar represents the same meaning as described above, and $R^6$ represents a hydrogen atom, a methyl group, or an ethyl group.

As the monomolecular type, a boronic acid derivative of the following formula (5) is more preferable, and as the polymer type, a boronic acid derivative containing a repeating unit of the following formula (6) is preferable.

[Chem. 9]

(5)

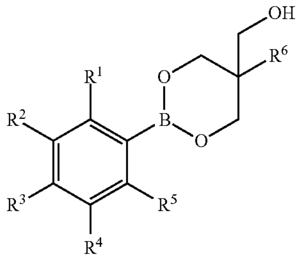

-continued (6)

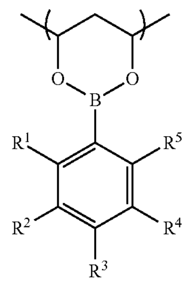

wherein $R^1$ to $R^5$ represent the same meaning as described above, and $R^6$ represents a hydrogen atom, a methyl group, or an ethyl group.

In addition, another example of the monomolecular type may be a borate salt of the following formula (7), and in the present invention, one represented by the formula (5) is more preferable.

[Chem. 10]

(7)

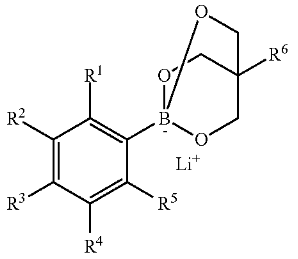

wherein $R^1$ to $R^5$ represent the same meaning as described above, and $R^6$ represents a hydrogen atom, a methyl group, or an ethyl group.

Specific examples of the monomolecular type include those represented by the following formulae (8-1) to (8-6).

[Chem. 11]

(8-1)

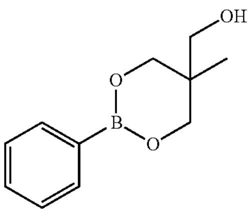

(8-2)

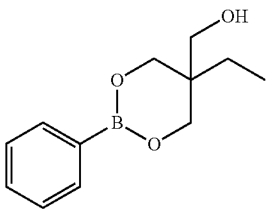

-continued (8-3)

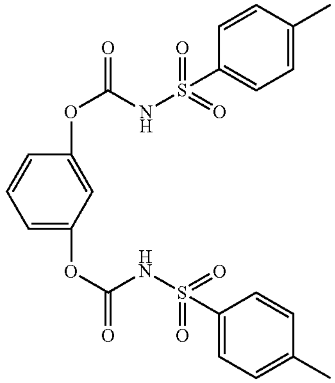

(8-4)

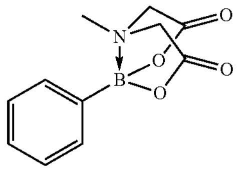

(8-5)

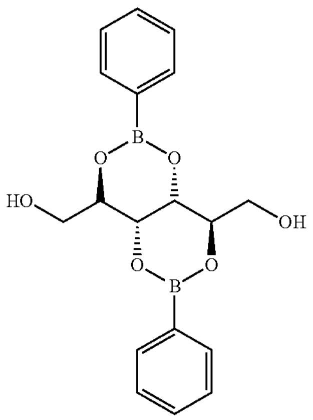

(8-6)

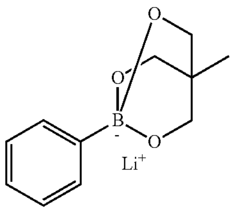

Specific examples of the polymer type include those containing a repeating unit of the following formulae (9-1) to (9-3).

[Chem. 12]

(9-1)

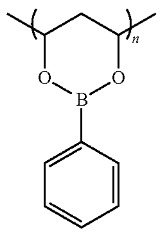

-continued (9-2)

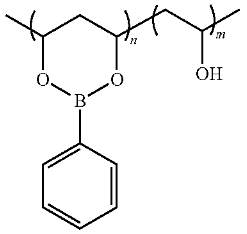

(9-3)

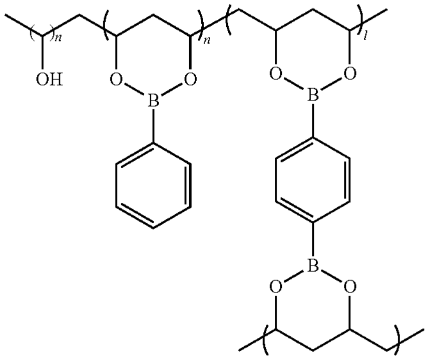

wherein n represents a natural number of 1 to 10,000, m represents a natural number of 1 to 10,000, and l represents a natural number of 1 to 1,000.

n is preferably a natural number of 10 to 10,000, more preferably a natural number of 50 to 10,000. m is preferably a natural number of 10 to 10,000, more preferably a natural number of 50 to 10,000. l is preferably a natural number of 10 to 1,000, more preferably a natural number of 50 to 1,000.

The average molecular weight of the polymer type is not particularly limited, and is preferably 1,000 to 2,000,000, more preferably 2,000 to 1,000,000, in terms of weight average molecular weight. The weight average molecular weight is a value measured by gel permeation chromatography (GPC) and calculated in terms of polystyrene.

In the present invention, the additive of polymer type contains repeating units of the formula (6) at preferably 10 to 100 mol %, more preferably 30 to 100 mol %, still more preferably 50 to 100 mol % in all the repeating units, from the viewpoint of obtaining a thin film having high adhesion with good reproducibility.

The polyvinyl alcohol or a derivative thereof, or the polyvinyl alcohol copolymer or a derivative thereof may contain, as a repeating unit, a vinyl acetate structure derived from vinyl acetic acid as a raw material. If the vinyl acetate structure is contained, the content thereof is preferably 50 mol % or less, more preferably 30 mol % or less in all repeating units.

In addition, the molecular weight of the polyvinyl alcohol or a derivative thereof, or the polyvinyl alcohol copolymer and a derivative thereof are not particularly limited, and for example, a numerical average molecular weight of about 1,000 to 500,000, preferably about 10,000 to 100,000 can be adopted. The weight average molecular weight is a value measured by GPC and calculated in terms of polystyrene.

The reaction between the arylboronic acid and the reactive compound may be performed by performing heating at a predetermined temperature in a solvent. The solvent used in the reaction is not particularly limited as long as it can disperse or dissolve raw materials to be used. Examples of the solvent include dimethyl sulfoxide, N,N-dimethylformamide, N,N-dimethylacetamide, N-methyl-2-pyrrolidone (NMP), hexamethylphosphoric acid triamide, acetonitrile, acetone, alcohols (e.g. methanol, ethanol, 1-propanol, 2-propanol and benzyl alcohol), glycols (e.g. ethylene glycol and triethylene glycol), cellosolves (e.g. ethyl cellosolve and methyl cellosolve), polyhydric alcohols (e.g. glycerin and pentaerythritol), tetrahydrofuran, esters (e.g. ethyl acetate and butyl acetate), aromatic hydrocarbons (e.g. benzene, toluene and xylene), aliphatic hydrocarbons (e.g. pentane, hexane, heptane and hexadecane), halogenated aliphatic hydrocarbons (e.g. chlorobenzene, dichlorobenzene and trichlorobenzene), and oleylamine, and these solvents can be used singly or in combination of two or more thereof. These solvents may be appropriately selected according to raw materials used.

Among them, a hydrophobic solvent is preferable and toluene is preferable it is possible to carry out a reaction by a Dean-Stark method.

The reaction temperature of the reaction is typically 40 to 200 °C. The reaction time is selected variously depending on the reaction temperature, and is typically about 30 minutes to 50 hours.

For the obtained boronic acid derivative, the reaction solution may be used directly, or diluted or concentrated and used, or the boronic acid derivative may be isolated, then dissolved in an appropriate solvent, and used. Examples of the solvent include the solvents described above.

The electrode composition of the present invention contains the above-described secondary battery electrode additive and an active material, and can be used as either of positive electrode and negative electrode compositions depending on selection of an active material type.

As the active material, various active materials heretofore used for secondary battery electrodes can be used. For example, for lithium secondary batteries and lithium ion secondary batteries, chalcogen compounds or lithium ion-containing chalcogen compounds capable of adsorbing and desorbing lithium ions, polyanionic compounds, and sulfur alone and compounds thereof can be used as the positive active material.

Examples of the chalcogen compound capable of adsorbing and desorbing lithium ions include $FeS_2$, $TiS_2$, $MoS_2$, $V_2O_6$, $V_6O_{13}$ and $MnO_2$.

Examples of the lithium ion-containing chalcogen compound include $LiCoO_2$, $LiMnO_2$, $LiMn_2O_4$, $LiMo_2O_4$, $LiV_3O_8$, $LiNiO_2$, $Li_xNi_yM_{1-y}O_2$ (M represents at least one metal element selected from Co, Mn, Ti, Cr, V, Al, Sn, Pb and Zn, $0.05 \leq x \leq 1.10$ and $0.5 \leq y \leq 1.0$), and $Li_aNi_{(1-x-y)}Co_xM^1_yM^2_zX_wO_2$ ($M^1$ represents at least one selected from the group consisting of Mn and Al, $M^2$ represents at least one selected from the group consisting of Zr, Ti, Mg, W, and V, $1.00 \leq a \leq 1.50$, $0.00 \leq x \leq 0.50$, $0 \leq y \leq 0.50$, $0.000 \leq z \leq 0.020$ and $0.000 \leq w \leq 0.020$).

Examples of the polyanionic compound include $LiFePO_4$.

Examples of the sulfur compound include $Li_2S$ and rubeanic acid.

These active materials can be used singly or in combination of two or more thereof.

In the present invention, among the above-described active materials, an oxide containing Li and Ni, or $Li_aNi_{(1-x-y)}Co_xM^1_yM^2_zX_wO_2$ ($M^1$ is at least one selected from the group consisting of Mn and Al, and $M^2$ is at least one selected from the group consisting of Zr, Ti, Mg, W, and V, $1.00 \leq a \leq 1.50$, $0.00 \leq x \leq 0.50$, $0 \leq y \leq 0.50$, $0.000 \leq z \leq 0.020$, $0.000 \leq w \leq 0.020$) is preferable.

The content of the active material is preferably 90.0 to 99.99 wt % and more preferably 92.0 to 98.0 wt % in the composition.

In the positive electrode composition, the content of the secondary battery electrode additive is preferably 0.01 to 10.0 wt %, more preferably 0.01 to 5.0 wt %, still more preferably 0.01 to 1.0 wt %, even more preferably 0.01 to 0.8 wt %, most preferably 0.01 to 0.45 wt % in the composition.

On the other hand, as the negative active material forming the negative electrode, alkali metal, an alkali alloy, at least one simple substance selected from elements of Groups 4 to 15 of the periodic table, which occludes and releases lithium ions, an oxide, a sulfide or a nitride, or a carbon material capable of reversibly occluding and releasing lithium ions can be used.

Examples of the alkali metal include Li, Na and K, and examples of the alkali metal alloy include Li—Al, Li—Mg, Li—Al—Ni, Na—Hg and Na—Zn.

Examples of the simple substance of at least one element selected from elements of groups 4 to 15 of the periodic table, which occludes and releases lithium ions include silicon, tin, aluminum, zinc, and arsenic.

Examples of the relevant oxide include silicon monoxide (SiO), silicon dioxide ($SiO_2$), tin silicon oxide ($SnSiO_3$), lithium bismuth oxide ($Li_3BiO_4$), lithium zinc oxide ($Li_2ZnO_2$), lithium titanate (LTO, $Li_4Ti_5O_{12}$), and titanium oxide.

Examples of the relevant sulfide include lithium iron sulfide ($Li_xFeS_2$ ($0 \leq x \leq 3$)) and lithium copper sulfide ($Li_xCuS$ ($0 \leq x \leq 3$)).

Examples of the relevant nitride include lithium-containing transition metal nitrides, specifically $Li_xM_yN$(M=Co, Ni, Cu, $0 \leq x \leq 3$, $0 \leq y \leq 0.5$), and lithium iron nitride ($Li_3FeN_4$).

Examples of the carbon material capable of reversibly occluding and releasing lithium ions include graphite, carbon black, coke, glassy carbon, carbon fibers, carbon nanotubes, and sintered bodies thereof.

In the present invention, among them, graphite, Si, SiO, LTO and metal Li are preferable.

The content of the negative active material is preferably 90.0 to 99.98 wt %, more preferably 90 to 98 wt % in the composition.

In the negative electrode composition, the content of the secondary battery electrode additive is preferably 0.02 to 10.0 wt %, more preferably 0.02 to 1.0 wt % in the composition.

The electrode composition of the present invention may contain a binder.

The binder can be appropriately selected from known materials and used, and is not particularly limited, and in the present invention, a nonaqueous binder can be suitably used.

Specific examples thereof include polyvinylidene fluoride (PVdF), polytetrafluoroethylene, tetrafluoroethylene-hexafluoropropylene copolymers, vinylidene fluoride-hexafluoropropylene copolymers (P(VDF-HFP)), vinylidene fluoride-trifluoroethylene chloride copolymers (P(VDF-CTFE)), polyvinyl alcohol, polyimide, ethylene-propylene-diene terpolymers, styrene-butadiene rubber, carboxymethyl cellulose (CMC), polyacrylic acid (PAA), polyaniline, tetrafluoroethylene, polyethylene, and polypropylene. These compounds can be used singly or in combination of two or more thereof.

The content of the binder is not particularly limited, and is preferably 0.1 to 5.0 wt %, more preferably 0.5 to 3.0 wt % in the composition. When the content of the binder is in the above-described range, good adhesion to the current collecting substrate can be obtained without reducing the capacity.

Further, the electrode composition of the present invention may contain a conduction aid.

Examples of the conduction aid include carbon materials such as graphite, carbon black, Ketjen black, acetylene black, vapor grown carbon fibers (VGCF), carbon nanotubes, carbon nanohorns, and graphene and conductive polymers such as polyaniline, polypyrrole, polythiophene, polyacetylene, and polyacene. The conduction aids can be used singly or in combination of two or more thereof.

The content of the conduction aid is not particularly limited, and is preferably 0.1 to 5.0 wt %, more preferably 0.5 to 3.0 wt % in the composition. When the content of the conduction aid in the above-described range, good electrical conductivity can be obtained.

The electrode composition of the present invention may contain a second additive other than the secondary battery electrode additive. Specific examples thereof include water, hydroxyl group-containing compounds, and compounds containing a nitrogen atom and a carbonyl structure.

It is considered that if water is added, an action of accelerating a neutralization reaction by a boron-based additive is obtained because the water can dissolve alkali impurities.

It is considered that the hydroxyl group-containing compound can be reversibly coordinated to a boron atom, and the coordinated boron atom can form a salt with a proton or a lithium ion. Thus, it can be expected that a film having lithium ion transportability is formed. Specific examples of the compound having a hydroxyl group include trimethylolethane, trimethylolethane, trimethylolpropane, glycerin, mannitol, pentaerythritol, dipentaerythritol, polyvinyl alcohol and derivatives thereof, and polyvinyl alcohol copolymers and derivatives thereof. In particular, trimethylolethane, mannitol, polyvinyl alcohol and derivatives thereof, and polyvinyl alcohol copolymers and derivatives thereof are preferable, and polyvinyl alcohol and derivatives thereof, and polyvinyl alcohol copolymers and derivatives thereof are more preferable.

Specific examples of the compound containing a nitrogen atom and a carbonyl structure include iminodiacetic acid, N-(2-hydroxyethyl)iminodiacetic acid, N-methyliminodiacetic acid, nitrilotriacetic acid, N,N-di(2-hydroxyethyl)glycine bicin, 1-methyl-4-piperidone, 1-ethyl-4-piperidone, and polyvinylpyrrolidone. In particular, N-methyliminodiacetic acid and polyvinylpyrrolidone are preferable, and polyvinylpyrrolidone is more preferable.

The second additives can be used singly or in combination of two or more thereof.

The content of the second additive is not particularly limited, and is preferably 0.01 to 10.0 wt %, more preferably 0.01 to 5.0 wt %, still more preferably 0.01 to 1.0 wt %, even more preferably 0.01 to 0.8 wt %, most preferably 0.01 to 0.45 wt % in the composition. In addition, the content of the second additive is preferably 0.02 to 40, more preferably 0.04 to 20 in terms of weight ratio to the secondary battery electrode additive 1.

It is also possible to use a solvent for preparing the electrode composition.

The solvent is not particularly limited as long as it has been heretofore used for preparing an electrode composition, and examples thereof include organic solvents such as water; ethers such as tetrahydrofuran (THF), diethyl ether and 1,2-dimethoxyethane (DME); halogenated hydrocarbons such as methylene chloride, chloroform and 1,2-dichloroethane; amides such as N,N-dimethylformamide (DMF), N,N-dimethylacetamide (DMAc) and N-methyl-2-pyrrolidone (NMP); ketones such as acetone, methyl ethyl ketone, methyl isobutyl ketone and cyclohexanone; alcohols such as methanol, ethanol, n-propanol, isopropanol, n-butanol and t-butanol; aliphatic hydrocarbons such as n-heptane, n-hexane and cyclohexane; aromatic hydrocarbons such as benzene, toluene, xylene and ethylbenzene; glycol ethers such as ethylene glycol monoethyl ether, ethylene glycol monobutyl ether and propylene glycol monomethyl ether; glycols such as ethylene glycol and propylene glycol; carbonates such as ethylene carbonate, propylene carbonate, dimethyl carbonate, diethyl carbonate, and methylethyl carbonate; and γ-butyrolactone, dimethyl sulfoxide (DMSO), dioxolane, and sulfolane. These solvents can be used singly or in combination of two or more thereof.

If the binder is used, the binder may be dissolved in such a solvent if necessary, and used.

Examples of the suitable solvent in this case include water, NMP, DMSO, ethylene carbonate, propylene carbonate, dimethyl carbonate, diethyl carbonate, methylethyl carbonate, γ-butyrolactone, THF, dioxolane, sulfolane, DMF, and DMAc, and the solvent may be appropriately selected according to the type of binder. NMP is suitable in the of a non-water-soluble binder such as PVdF, and water is suitable in the case of a water-soluble binder such as PAA.

The solid content concentration of the electrode composition of the present invention is appropriately set in consideration of the applicability of the composition and the thickness of the thin film. In the positive electrode, the solid content concentration is typically about 50 to 90 wt %, preferably 55 to 85 wt %, more preferably 60 to 80 wt %. In the negative electrode, the solid content concentration is about 30 to 70 wt %, preferably about 30 to 65 wt %, more preferably about 35 to 60 wt %. The solid content means components other than the solvent which form the composition.

The electrode composition of the present invention can be obtained by mixing the above-described components while heating the components at a predetermined temperature. Reflux may be performed during heating. If an optional component other than the additive of the present invention and the active material is contained, the additive and the active material may be mixed together with the optional component, or may be mixed with each other, and then mixed with the optional component. In any of the methods, a surface of the active material can be covered with the additive, so that the effect of the present invention can be sufficiently exhibited.

In the present invention, in production of the electrode composition, the maximum temperature during preparation is preferably 60 to 200 °C, more preferably 60 to 150 °C, still more preferably 60 to 130 °C, and still more preferably, the upper limit being lower than 130 °C, for example, 60 to 125 °C, from the viewpoint of the environmental load, process cost and safety.

The secondary battery electrode of the present invention includes an active material layer (thin film) formed of the above-described electrode composition on at least one surface of a substrate that is a current collector.

If the active material layer is formed on the substrate, examples of the method for forming the active material layer include a method in which an electrode composition prepared without using a solvent is pressure-molded on a substrate (dry method), and a method in which an electrode composition is prepared using a solvent, applied on a substrate, and dried (wet method). These methods are not particularly limited, and various heretofore known methods can be used. Examples of the wet method include various printing methods such as offset printing and screen printing, a blade coating method, a dip coating method, a spin coating method, a bar coating method, a slit coating method, an inkjet method, and a die coating method.

If drying is performed, it may be natural drying or drying by heating, but drying by heating is preferable from the viewpoint of production efficiency. If drying by heating is performed, the temperature is preferably about 50 to 400 °C, more preferably about 70 to 150 °C.

Examples of the substrate used for the electrode include metal substrates of platinum, gold, iron, stainless steel, copper, aluminum, lithium and the like, alloy substrates composed of an arbitrary combination of these metals, oxide substrates of indium tin oxide (ITO), indium zinc oxide (IZO), antimony tin oxide (ATO) and the like, and carbon substrates of glassy carbon, pyrolytic graphite and carbon felt. The thickness of the substrate is not particularly limited, and is preferably 1 to 100 μm in the present invention.

The thickness of the active material layer (thin film) is not particularly limited, and is preferably about 0.01 to 1,000 μm, more preferably about 5 to 300 μm. If the thin film is used alone as an electrode, the thickness is preferably 10 lam or more.

The electrode may be pressed if necessary. As a pressing method, a commonly employed method can be used, and in particular, a mold pressing method or a roll pressing method is preferable. The pressing pressure is not particularly limited, and is preferably 1 kN/cm or more, preferably 2 kN/cm or more, more preferably 5 kN/cm or more. The upper limit of the pressing pressure is not particularly limited, and is preferably 50 kN/cm or less.

In a secondary battery electrode (positive electrode) after charge and discharge, the intensity ratio between an intensity of a C—F peak (686±1.25 eV) and an intensity of a LiF peak (683.5±1.25 eV) ([C—F]/[LiF]), which is determined by XPS measurement (the C—C-derived peak of C1s is standardized as 284 eV), is preferably 3.0 or more, more preferably 4.5 or more. The upper limit of the intensity ratio is not particularly limited, and is preferably 10.0 or less, preferably 6.0 or less.

The secondary battery of the present invention includes the above-described electrodes. More specifically, the secondary battery includes at least a pair of positive and negative electrodes, a separator interposed between the electrodes, and an electrolyte. At least one of the positive and negative electrodes includes the above-described electrode. Other constituent members of the battery element may be appropriately selected from heretofore known constituent members and used.

Examples of the material used for the separator include glass fibers, cellulose, porous polyolefins, polyamide, and polyester.

The electrolyte may be liquid or solid, and may be aqueous or nonaqueous, and from the viewpoint of easily exhibiting performance sufficient for practical use, an electrolyte solution including an electrolyte salt, which is a main component for ion conduction, a solvent, and the like can be suitably used.

Examples of the electrolyte salt include lithium salts such as $LiPF_6$, $LiBF_4$, $LiN(SO_2F)_2$, $LiN(C_2F_5SO_2)_2$, $LiAsF_6$, $LiSbF_6$, $LiAlF_4$, $LiGaF_4$, $LiInF_4$, $LiClO_4$, $LiN(CF_3SO_2)_2$, $LiCF_3SO_3$, $LiSiF_6$, $LiN(CF_3SO_2)$ and $(C_4F_9SO_2)$; metal iodides such as LiI, NaI, KI, CsI, and $CaI_2$; iodide salts of quaternary imidazolium compounds; iodide salts and perchlorate salts of tetraalkylammonium compounds; and metal bromides such as LiBr, NaBr, KBr, CsBr, and $CaBr_2$. These electrolyte salts can be used singly or in combination of two or more thereof.

The solvent is not particularly limited as long as it does not degrade performance by corroding or decomposing substances forming the battery, and dissolves the electrolyte salt. For example, as the nonaqueous solvent, cyclic esters such as ethylene carbonate, propylene carbonate, butylene carbonate and γ-butyrolactone, ethers such as tetrahydrofuran and dimethoxyethane, chain esters such as methyl acetate, dimethyl carbonate, diethyl carbonate, and ethyl methyl carbonate, nitriles such as acetonitrile, and the like are used. These solvents can be used singly or in combination of two or more thereof.

As the solid electrolyte, inorganic solid electrolytes such as sulfide-based solid electrolytes and oxide-based solid electrolytes, and organic solid electrolytes such as polymer-based electrolytes can be suitably used. By using any of these solid electrolytes, an all-solid-state battery can be obtained in which an electrolyte solution is not used.

Examples of the sulfide-based solid electrolyte include Li2S—SiS2-lithium compounds (here, the lithium compound is at least one selected from the group consisting of $Li_3PO_4$, LiI and $Li_4SiO_4$), and thio-LISICON-based materials such as $Li_2S—P_2O_5$, $Li_2S—B_2S_5$, and $Li_2S—P_2S_5—GeS_2$.

Examples of the oxide-based solid electrolyte include $Li_5La_3M_2O_{12}$ (M=Nb, Ta) and $Li_7La_3Zr_2O_{12}$ which are oxides having a garnet structure, an oxyacid salt compounds based on a γ-$Li_3PO_4$ structure, which are collectively known as LISICON, perovskite, $Li_{3.3}PO_{3.8}N_{0.22}$ collectively known as LIPON, and sodium/alumina.

Examples of the polymer-based solid electrolyte include polyethylene oxide materials, and polymer compounds obtained by polymerizing or copolymerizing a monomer such as hexafluoropropylene, tetrafluoroethylene, trifluoroethylene, ethylene, propylene, acrylonitrile, vinylidene chloride, acrylic acid, methacrylic acid, methyl acrylate, ethyl acrylate, methyl methacrylate, styrene or vinylidene fluoride. The polymer-based solid electrolyte may contain a supporting electrolyte and a plasticizer.

Examples of the supporting electrolyte contained in the polymer-based solid electrolyte include lithium (fluorosulfonylimide), and examples of the plasticizer include succinonitrile.

A battery produced using the electrode composition of the present invention is superior in cycle characteristics and rate characteristics as compared to a common secondary battery.

The form of the secondary battery and the type of the electrolyte are not particularly limited, and the secondary battery may be used in the form of any of a lithium ion battery, a nickel hydrogen battery, a manganese battery, an air battery and the like. A lithium ion battery is suitable. The lamination method and the production method are not particularly limited.

If the secondary battery is applied to a coin type, the above-described secondary battery electrode of the present invention may be punched in a predetermined disc shape, and used. For example, a lithium ion secondary battery can be produced by installing one electrode on a lid of a coin cell, to which a washer and a spacer are welded, stacking a separator with the same shape, which is impregnated with an electrolyte solution, on the electrode, stacking the secondary battery electrode of the present invention from above with the active material layer down, placing a case and a gasket, and performing sealing with a coin cell caulking machine.

EXAMPLES

Examples and Comparative Examples are given below to more concretely illustrate the invention, although the invention is not limited by these Examples. The apparatuses used are as follows.

(1) HOMODISPER (Mixing of Electrode Slurry)
  T.K. ROBOMIX manufactured by PRIMIX Corporation (with HOMODISPER Model 2.5 (φ32))

(2) Thin-Film Rotary High-Speed Mixer (Mixing of Electrode Slurry)
  FILMIX Model 40 manufactured by PRIMIX Corporation (3) Roll Press Machine (Compression of Electrode)
  manufactured by Takumi Giken Co., Ltd., SA-602

(4) Dry Booth
  manufactured by Nihon Spindle Manufacturing Co., Ltd.

(5) Pressure Sensitive Adhesion/Film Peel Analyzer (Measurement of Adhesion Strength)
  VERSATILE PEEL ANALYZER VPA-3 manufactured by Kyowa Interface Science Co., Ltd.

(6) Charge and Discharge Measuring Apparatus
  TOSCAT-3100 manufactured by TOYO SYSTEM Co., LTD.
  Temperature: room temperature (7) Impedance Measuring Apparatus
  PARSTAT 2273 manufactured by Princeton Applied Research Company
  AC Amplitude: 10mVrms
  Frequency: 200 kHz to 100 mHz
  Temperature: room temperature (8) XPS Measurement
  PHI 5000 VersaProbe II manufactured by ULVAC-PHI, Inc.
  Measurement region: 1,000 μmφ neutralization ON (electron gun only)
  Number of measurements: 2
  X-ray: Al Ka 1486.6 eV (25 W, 15 kV)
  Analyzer: Photoelectron
  Take off angle: 45 deg from sample plane

[1] Synthesis of Secondary Battery Electrode Additive

Example 1-1

6.10 g (0.05 mol) of phenylboronic acid (manufactured by Tokyo Chemical Industry Co., Ltd., the same applies hereinafter), 6.00 g (0.05 mol) of trimethylolethane (manufactured by Tokyo Chemical Industry Co., Ltd.) and 100 g of toluene (manufactured by Kanto Chemical Co., Inc., the same applies hereinafter) were put in a flask together with a stirring bar. A Dean-Stark tube and a condenser were connected to the flask, and the flask was immersed in an oil bath set at 130 °C. The Phenylboronic acid and the trimethylolethane were reacted by refluxing the mixture for 4 hours while appropriately removing water and toluene accumulated in the Dean-Stark tube. The solvent was distilled off under reduced pressure from the reaction solution to obtain a boronic acid derivative of the following formula (8-1).

[Chem. 13]

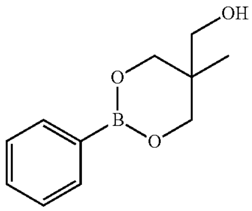

(8-1)

Example 1-2

6.18 g (0.03 mol) of the boronic acid derivative of the formula (8-1), 0.65 g (0.0027 mol) of lithium hydroxide (manufactured by Kishida Chemical Co., Ltd.) and 61.45 g of toluene (manufactured by Kanto Chemical Co., Inc.) were put in a flask together with a stirring bar. A Dean-Stark tube and a condenser were connected to the flask, and the flask was immersed in an oil bath set at 130 °C. The boronic acid derivative of the formula (8-1) and the lithium hydroxide were reacted by refluxing the mixture for 4 hours while appropriately removing water and toluene accumulated in the Dean-Stark tube. The solvent was distilled off under reduced pressure from the reaction solution to obtain a triolborate lithium salt of the following formula (8-6).

[Chem. 14]

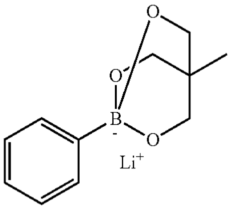

(8-6)

[2] Preparation of Positive Electrode Composition (Electrode Slurry)

Example 2-1

In a dry booth, 40.28 g of lithium nickel cobalt manganese oxide (NCM, $LiNi_{0.8}Co_{0.1}Mn_{0.1}O_2$ manufactured by LinYi Gelon LIB Co., Ltd., S-800, the same applies hereinafter) as an active material, 12.00 g of a solution of polyvinylidene fluoride (PVdF manufactured by SOLVAY S.A., Solef-5140, the same applies hereinafter) in NMP (special grade) (manufactured by Junsei Chemical Co., Ltd., the same applies hereinafter) (7 wt %) as a binder, 0.84 g of acetylene black (AB, DENKA BLACK manufactured by Denka Company Limited, the same applies hereinafter) as a conduction aid, 1.4 g of a solution of the secondary battery electrode additive synthesized in Example 1-1 in NMP (3 wt %) and 5.48 g of NMP (special grade) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive=95.9:2:2:0.1 (weight ratio)).

Example 2-2

In a dry booth, 40.11 g of lithium nickel cobalt manganese oxide as an active material, 12.00 g of a solution of polyvinylidene fluoride in NMP (special grade) (7 wt %) as a binder, 0.84 g of acetylene black as a conduction aid, 7.0 g of a solution of the secondary battery electrode additive synthesized in Example 1-1 in NMP (special grade) (3 wt %) and 0.05 g of NMP (special grade) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive=95.5:2:2:0.5 (weight ratio)).

Example 2-3

In a dry booth, 40.11 g of lithium nickel cobalt manganese oxide as an active material, 12.00 g of a solution of polyvinylidene fluoride in NMP (special grade) (7 wt %) as a binder, 0.84 g of acetylene black as a conduction aid, 7.0 g of a solution of the secondary battery electrode additive synthesized in Example 1-2 in NMP (special grade) (3 wt %) and 0.05 g of NMP (special grade) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive=95.9:2:2:0.1 (weight ratio)).

Comparative Example 2-1

In a dry booth, 40.32 g of lithium nickel cobalt manganese oxide as an active material, 12.00 g of a solution of polyvinylidene fluoride in NMP (special grade) (7 wt %) as a binder, g of acetylene black as a conduction aid and 6.84 g of NMP (special grade) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive=96:2:2:0 (weight ratio)).

Comparative Example 2-2

In a dry booth, 40.11 g of lithium nickel cobalt manganese oxide as an active material, 12.00 g of a solution of polyvinylidene fluoride in NMP (special grade) (7 wt %) as a binder, 0.84 g of acetylene black as a conduction aid, 4.21 g of a solution of p-toluenesulfonyl isocyanate (manufactured by Tokyo Chemical Industry Co., Ltd.) in NMP (special grade) (5 wt %) as an additive and 2.85 g of NMP (special grade) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive=95.5:2:2:0.5 (weight ratio)).

Comparative Example 2-3

In a dry booth, 40.28 g of lithium nickel cobalt manganese oxide as an active material, 12.00 g of a solution of polyvinylidene fluoride in NMP (special grade) (7 wt %) as a binder, 0.84 g of acetylene black as a conduction aid, 0.042 g of acetylene black as an additive and 6.84 g of NMP (special grade) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive=95.9:2:2:0.1 (weight ratio)).

Comparative Example 2-4

In a dry booth, 40.28 g of lithium nickel cobalt manganese oxide as an active material, 12.00 g of a solution of polyvinylidene fluoride in NMP (special grade) (7 wt %) as a binder, 0.84 g of acetylene black as a conduction aid, 1.4 g of a solution of trimethyl borate (manufactured by Kishida Chemical Co., Ltd.) in NMP (special grade) (3 wt %) as an additive and 5.48 g of NMP (special grade) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive=95.9:2:2:0.1 (weight ratio)).

Comparative Example 2-5

In a dry booth, 40.28 g of lithium nickel cobalt manganese oxide as an active material, 12.00 g of a solution of polyvinylidene fluoride in NMP (special grade) (7 wt %) as a binder, 0.84 g of acetylene black as a conduction aid, 1.4 g of a solution of phenylboronic acid in NMP (special grade) (3 wt %) as an additive and 5.48 g of NMP (special grade) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive=95.9:2:2:0.1 (weight ratio)).

Comparative Example 2-6

In a dry booth, 40.11 g of lithium nickel cobalt manganese oxide as an active material, 12.00 g of a solution of polyvinylidene fluoride in NMP (special grade) (7 wt %) as a binder, 0.84 g of acetylene black as a conduction aid, 7.0 g of a solution of phenylboronic acid in NMP (special grade) (3 wt %) as an additive and 0.05 g of NMP (special grade) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive=95.5:2:2:0.5 (weight ratio)).

Comparative Example 2-7

In a dry booth, 40.28 g of lithium nickel cobalt manganese oxide as an active material, 12.00 g of a solution of polyvinylidene fluoride in NMP (special grade) (7 wt %) as a binder, 0.84 g of acetylene black as a conduction aid, 1.4 g of a solution of phosphorous acid (manufactured by FUJIFILM Wako Pure Chemical Corporation) in NMP (special grade) (3 wt %) as an additive and 5.48 g of NMP (special grade) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive=95.9:2:2:0.1 (weight ratio)).

Comparative Example 2-8

In a dry booth, 40.28 g of lithium nickel cobalt manganese oxide as an active material, 12.00 g of a solution of polyvinylidene fluoride in NMP (special grade) (7 wt %) as a binder, 0.84 g of acetylene black as a conduction aid, 1.4 g of a solution of trimethylolethane (manufactured by Tokyo Chemical Industry Co., Ltd.) in NMP (special grade) (3 wt %) as an additive and 5.48 g of NMP (special grade) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive=95.9:2:2:0.1 (weight ratio)).

Comparative Example 2-9

In a dry booth, 40.28 g of lithium nickel cobalt manganese oxide as an active material, 12.00 g of a solution of polyvinylidene fluoride in NMP (special grade) (7 wt %) as a binder, 0.84 g of acetylene black as a conduction aid, 0.042 g of lithium metaborate ($LiBO_2$ manufactured by Kishida Chemical Co., Ltd.) as an additive and 6.84 g of NMP (special grade) were mixed at 8,000 rpm for 1 minute with HOMODISPER. Subsequently, using a thin-film rotary high-speed mixer, mixing treatment was performed at a peripheral speed of 20 msec for 30 seconds twice to prepare an electrode slurry (solid content concentration: 70 wt %, NCM:PVdF:AB:additive=95.9:2:2:0.1 (weight ratio)).

Comparative Example 2-10

In a dry booth, 40.28 g of lithium nickel cobalt manganese oxide as an active material, 12.00 g of a solution of polyvinylidene fluoride in NMP (special grade) (7 wt %) as a binder, 0.84 g of acetylene black as a conduction aid, 1.4 g of a solution of triethylene glycol (manufactured by Tokyo Chemical Industry Co., Ltd.) in NMP (special grade) (3 wt %) as an additive and 5.48 g of NMP (special grade) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive=95.9:2:2:0.1 (weight ratio)).

Comparative Example 2-11

In a dry booth, 40.28 g of lithium nickel cobalt manganese oxide as an active material, 12.00 g of a solution of polyvinylidene fluoride in NMP (special grade) (7 wt %) as a binder, 0.84 g of acetylene black as a conduction aid, 1.4 g of a solution of glycerol (manufactured by Tokyo Chemical Industry Co., Ltd.) in NMP (special grade) (3 wt %) as an additive and 5.48 g of NMP (special grade) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive=95.9:2:2:0.1 (weight ratio)).

[3] Preparation of Positive Electrode and Evaluation of Adhesion Strength

Examples 3-1 to 3-3 and Comparative Examples 3-1 to 3-11

The electrode slurry obtained in each of Examples 2-1 to 2-3 and Comparative Examples 2-1 to 2-11 was uniformly applied to an aluminum foil (15 μm thick, manufactured by UACJ Corporation) as a current collector using a doctor blade, dried at 80 °C for 30 minutes to form an active material layer, and compressed by a roll press machine to produce an electrode (positive electrode). The coating thickness was adjusted so that the weight per unit area of the electrode was 30±1 mg/cm$^2$. Table 1 collectively shows electrode slurries and additives used in examples and comparative examples, and the composition rations of the electrode slurries.

<Measurement of Adhesion Strength>

The electrode produced in each of Examples and Comparative Examples was cut to a width of 25 mm, and fixed on a glass substrate with a 20 mm-wide double-sided tape bonded to an active material layer-coated surface of the electrode. This was fixed to a pressure sensitive adhesion/film peel analyzer, and a peeling test was conducted at a peeling angle of 90° and a peeling rate of 100 mm/min to measure adhesion strength. The results are shown in Table 1. The maximum temperature during preparation of each composition is also shown.

TABLE 1

| | Electrode slurry | Additive | Composition ratio (NCM/PVdF/AB/Additive) | Maximum temperature (°C) | Adhesion strength (N/m) |
|---|---|---|---|---|---|
| Example 3-1 | Example 2-1 | Example 1-1 | 95.9/2/2/0.1 | 68.8 | 99.93 |
| Example 3-2 | Example 2-2 | Example 1-1 | 95.5/2/2/0.5 | 68.7 | 71.45 |
| Example 3-3 | Example 2-3 | Example 1-2 | 95.5/2/2/0.5 | 72.1 | 42.90 |
| Comparative Example 3-1 | Comparative Example 2-1 | None | 96/2/2/0 | 68.5 | 38.83 |
| Comparative Example 3-2 | Comparative Example 2-2 | p-toluenesulfonyl isocyanate | 95.5/2/2/0.5 | 77.0 | 42.93 |
| Comparative Example 3-3 | Comparative Example 2-3 | Acetylene black | 95.9/2/2/0.1 | 68.7 | 37.80 |
| Comparative Example 3-4 | Comparative Example 2-4 | Trimethyl borate | 95.9/2/2/0.1 | 67.9 | 40.90 |
| Comparative Example 3-5 | Comparative Example 2-5 | Phenylboronic acid | 95.9/2/2/0.1 | 67.1 | 39.08 |
| Comparative Example 3-6 | Comparative Example 2-6 | Phenylboronic acid | 95.5/2/2/0.5 | 66.8 | 49.23 |
| Comparative Example 3-7 | Comparative Example 2-7 | Phosphorous acid | 95.9/2/2/0.1 | 68.7 | 47.73 |
| Comparative Example 3-8 | Comparative Example 2-8 | Trimethylolethane | 95.9/2/2/0.1 | 67.1 | 38.68 |
| Comparative Example 3-9 | Comparative Example 2-9 | Lithium metaborate | 95.9/2/2/0.1 | 65.0 | 25.13 |
| Comparative Example 3-10 | Comparative Example 2-10 | Triethylene glycol | 95.9/2/2/0.1 | 64.1 | 26.35 |
| Comparative Example 3-11 | Comparative Example 2-11 | Glycerol | 95.9/2/2/0.1 | 67.2 | 22.80 |

As shown in Table 1, it was confirmed that when an active material layer was formed using an electrode slurry containing the secondary battery electrode additive according to the present invention, adhesion strength between the current collector and the active material layer was improved. It can be expected that the material is capable of improving handleability in a battery assembly process and broadens the design specifications of batteries.

[4] Production of Battery and Evaluation of Characteristics

[Production Example 1] Production of Negative Electrode 23.49 g of graphite (CGB10 manufactured by Nippon Graphite Industries, Co., Ltd.) as an active material, 0.5 g of acetylene black as a conduction aid, 0.5 g of carboxymethyl cellulose (CMC, manufactured by AS ONE Corporation) as a binder, 1.55 g of an aqueous emulsion solution containing a styrene-butadiene copolymer (SBR) (48.5 wt %) (TRD 2001 manufactured by JSR Corporation) and 26.46 g of pure water were mixed at 8,000 rpm for 5 minutes with HOMODISPER. Subsequently, using a thin-film rotary high-speed mixer, mixing treatment was performed at a peripheral speed of 20 m/sec for 30 seconds twice to produce an electrode slurry (solid content concentration: 47.6 wt %, CMC:SBR:AB=94:2:3:2 (weight ratio)). The obtained electrode slurry was uniformly applied to an electrolytic copper foil (10 μm-thick, manufactured by FUKUDA METAL FOIL & POWDER CO., LTD, the same applies hereinafter) using a doctor blade, dried at 80 °C for 30 minutes to form an active material layer, and compressed by a roll press machine to produce a negative electrode. The coating thickness was adjusted so that the weight per unit area of the electrode was 18±1 mg/cm$^2$.

Examples 4-1 to 4-3, Comparative Examples 4-1 to 4-11

Four disk-shaped electrodes having a diameter of 10 mm were punched out from the positive electrode obtained in each of Examples 3-1 to 3-3 and Comparative Examples 3-1 to 3-11, the weight of the positive electrode layer (a weight obtained by subtracting the weight of electrode-non-coated portion punched out and having a diameter of 10 mm from the weight of the electrode punched out) and the thickness of the electrode layer (a thickness obtained by subtracting the thickness of the substrate from the thickness of the electrode punched out) were measured, and dried under vacuum at 120 °C for 15 hours, and the electrodes were then transferred to a dry booth.

Four disk-shaped electrodes having a diameter of 13 mm were punched out from the negative electrode obtained in Production Example 1, the weight of the negative electrode layer (a weight obtained by subtracting the weight of electrode-non-coated portion punched out and having a diameter of 10 mm from the weight of the electrode punched out) and the thickness of the electrode layer (a thickness obtained by subtracting the thickness of the substrate from the thickness of the electrode punched out) were measured, and dried under vacuum at 120 °C for 15 hours, and the electrodes were then transferred to a dry booth.

A negative electrode was installed on a lid of a 2032 type coin cell (manufactured by Hohsen Corporation, the same applies hereinafter), to which a washer and a spacer were welded, and a separator (Glass fiber circular filter paper GF/F, manufactured by WATT MANN CO., LTD., the same applies hereinafter), which was punched out to a diameter of 16 mm and impregnated with a mixture of 20 g of an electrolyte solution (obtained by dissolving lithium hexafluorophosphate as an electrolyte at 1 M in ethylene carbonate:diethyl carbonate=1:1 (volume ratio), manufactured by Kishida Chemical Co., Ltd., the same applies hereinafter) and 0.4 g of fluoroethylene carbonate (manufactured by Kishida Chemical Co., Ltd., the same applies hereinafter), was stacked on the negative electrode. From above, the positive electrode was stacked with the active material-coated surface down. A drop of the electrolyte solution was added, a case to which a washer and a spacer were welded, and a gasket were then placed thereon, and sealing was performed with a coin cell caulking machine. Thereafter, this was left standing for 24 hours to produce four test secondary batteries of each of Examples 4-1 to 4-3 and Comparative Examples 4-1 to 4-11.

<Evaluation of Charge and Discharge>

The characteristics of the test secondary batteries produced in Examples and Comparative Examples were evaluated. For the purpose of evaluating the influence of the additive on the battery in the positive electrode, a charge and discharge test was conducted, in which aging of the battery, evaluation of load characteristics and evaluation of cycle characteristics were performed in this order using a charge and discharge measuring apparatus under the conditions shown in Table 2.

TABLE 2

| Step | 1 Aging | 2 Treatment before EIS measurement | 3 EIS measurement | 4 Evaluation of rate characteristics | | | | | 5 Cycle test | 6 Stabilization | 7 Treatment before EIS measurement | 8 EIS measurement |
|---|---|---|---|---|---|---|---|---|---|---|---|---|
| Charge condition: CC (C rate) | 0.2 | 0.2 | | 0.2 | 0.2 | 0.2 | 0.2 | 0.2 | 0.2 | 0.2 | 0.2 | |
| Discharge condition: CC (C rate) | 0.2 | — | | 0.2 | 0.5 | 1 | 2 | 3 | 0.5 | 0.2 | — | |
| Discharge condition: CV (mAh) | — | — | | — | — | — | — | — | — | — | — | |
| Cycle number | 5 | 1 | | 2 | 2 | 2 | 2 | 2 | 100 | 2 | 1 | |
| End-point condition | 3-4.2 V | 2.5 h | | | | | 3-4.4 V | | | | 2.5 h | |

Table 3 collectively shows capacities at the 1st and 100th cycles in the cycle test.

<Impedance Measurement>

The characteristics of the test secondary batteries produced in Examples and Comparative Examples were evaluated. For the purpose of evaluating the influence of the additive on the battery in the positive electrode, impedance measurement was performed.

Table 3 correctively shows resistance values at 100 mHz which were determined by impedance measurement in steps 3 and 8.

TABLE 3

| | Positive electrode | Initial ACR after aging (Ω) Zr (C) | ACR after cycle test (Ω) Zr (C) | Initial 3C discharge capacity (mAh/g) | Cycle test discharge capacity (mAh/g) 1st cycle | Cycle test discharge capacity (mAh/g) 100th cycle |
|---|---|---|---|---|---|---|
| Example 4-1 | Example 3-1 | 17.57 | 24.99 | 23.44 | 111.83 | 100.61 |
| Example 4-2 | Example 3-2 | 18.83 | 31.10 | 21.24 | 106.09 | 97.01 |
| Example 4-3 | Example 3-3 | 18.01 | 30.75 | 23.52 | 108.32 | 96.83 |
| Comparative Example 4-1 | Comparative Example 3-1 | 22.22 | 67.41 | 21.48 | 113.86 | 73.43 |

TABLE 3-continued

| | Positive electrode | Initial ACR after aging (Ω) Zr (C) | ACR after cycle test (Ω) Zr (C) | Initial 3C discharge capacity (mAh/g) | Cycle test discharge capacity (mAh/g) 1st cycle | 100th cycle |
|---|---|---|---|---|---|---|
| Comparative Example 4-2 | Comparative Example 3-2 | 19.70 | 33.77 | 24.04 | 114.17 | 92.24 |
| Comparative Example 4-3 | Comparative Example 3-3 | 20.41 | 42.97 | 22.83 | 112.52 | 102.64 |
| Comparative Example 4-4 | Comparative Example 3-4 | 27.18 | 37.99 | 13.00 | 76.97 | 74.74 |
| Comparative Example 4-5 | Comparative Example 3-5 | 25.55 | 55.81 | 16.30 | 84.79 | 77.29 |
| Comparative Example 4-6 | Comparative Example 3-6 | 469.62 | 122.06 | 3.91 | 38.10 | 28.30 |
| Comparative Example 4-7 | Comparative Example 3-7 | 24.48 | 42.36 | 14.81 | 81.97 | 80.11 |
| Comparative Example 4-8 | Comparative Example 3-8 | 23.74 | 32.80 | 15.50 | 80.05 | 79.83 |
| Comparative Example 4-9 | Comparative Example 3-9 | 25.17 | 75.14 | 20.81 | 109.59 | 95.63 |
| Comparative Example 4-10 | Comparative Example 3-10 | 24.69 | 49.92 | 18.74 | 97.55 | 91.52 |
| Comparative Example 4-11 | Comparative Example 3-11 | 24.43 | 78.77 | 22.22 | 109.93 | 95.06 |

As shown in Table 3, it can be seen that the secondary battery using a positive electrode having an active material layer formed using an electrode slurry containing the secondary battery electrode additive according to the present invention is excellent in capacity, resistance and cycle characteristics.

<XPS Measurement>

Evaluation of Positive Electrode after Charge and Discharge

The coin cells of Examples 4-1 to 4-3 and Comparative Examples 4-1 to 4-11 which were produced using the positive electrodes produced in Examples 3-1 to 3-3 and Comparative Examples 3-1 to 3-11 were used. After the charge and discharge test, each battery was discharged to 3 V at 0.3 C—CC, subjected to CV discharge at 3 V at a cutoff current of 0.03 mA, and then disassembled to take out the positive electrode. The positive electrode was washed with diethyl carbonate, and dried, and XPS measurement was then performed under the above-described conditions. On the basis of on the measurement results, the intensity ratio between a C—F bond-derived peak (685-687 eV) obtained with C—C-derived peak position of C1s standardized as 284 eV and a LiF-derived peak (682.5-684.5) was calculated. The results are shown in Table 4.

TABLE 4

| Positive electrode (after test) | C—F Peak position (eV) | C—F Intensity | LiF Peak position (eV) | LiF Intensity | Intensity ratio [C—F]/[LiF] |
|---|---|---|---|---|---|
| Example 4-1 | 686.4 | 4983.5 | 683.9 | 1024.5 | 4.885 |
| Example 4-2 | 686.0 | 4467.5 | 684.0 | 922.0 | 4.845 |
| Example 4-3 | 686.2 | 3852.5 | 683.6 | 1536.0 | 2.508 |
| Comparative Example 4-1 | 686.4 | 3968.5 | 683.8 | 3199.5 | 1.245 |
| Comparative Example 4-2 | 686.4 | 2564.0 | 683.7 | 3919.0 | 0.654 |
| Comparative Example 4-3 | 686.3 | 3874.5 | 683.7 | 908.5 | 4.265 |
| Comparative Example 4-4 | 686.3 | 3394.0 | 683.8 | 3178.0 | 1.068 |
| Comparative Example 4-5 | 686.3 | 4530.5 | 683.9 | 739.5 | 6.126 |
| Comparative Example 4-6 | 686.0 | 3311.0 | 683.9 | 3574.5 | 0.926 |
| Comparative Example 4-7 | 685.9 | 4155.0 | 683.8 | 2576.0 | 1.613 |
| Comparative Example 4-8 | 686.5 | 2375.0 | 683.7 | 2613.0 | 0.909 |
| Comparative Example 4-9 | 686.6 | 2929.0 | 684.2 | 2364.5 | 1.239 |
| Comparative Example 4-10 | 686.5 | 2743.0 | 684.1 | 2270.0 | 1.208 |
| Comparative Example 4-11 | 686.3 | 2823.0 | 683.9 | 1616.0 | 1.747 |

[5] Preparation of Negative Electrode Composition (Electrode Slurry)

Example 5-1

6.02 g of silicon monoxide (SiO manufactured by Osaka Titanium Technologies, Co., Ltd., the same applies hereinafter) and 12.79 g of spheroidized natural graphite (Gr manufactured by Nippon Graphite Industries, Co., Ltd., CGB-10, the same applies hereinafter) as active materials, 14.46 g of a solution of polyvinylidene fluoride in NMP (special grade) (7 wt %) as a binder, 0.41 g of acetylene black as a conduction aid, 0.68 g of a solution of the secondary battery electrode additive synthesized in Example 1-1 in NMP (special grade) (3 wt %), and 10.64 g of NMP (special grade) were mixed at 8,000 rpm for 30 seconds twice with HOMODISPER. Subsequently, using a thin-film rotary high-speed mixer, mixing treatment was performed at a peripheral speed of 20 m/sec for 30 seconds twice to prepare an electrode slurry (solid content concentration: 45 wt %, SiO/Gr/PVdF/AB/additive=29.73/63.17/5.0/2.0/0.1 (weight ratio)).

Example 5-2

5.99 g of silicon monoxide and 12.74 g of spheroidized natural graphite as active materials, 14.46 g of a solution of polyvinylidene fluoride in NMP (special grade) (7 wt %) as a binder, 0.41 g of acetylene black as a conduction aid, 3.38 g of a solution of the secondary battery electrode additive synthesized in Example 1-1 in NMP (special grade) (3 wt %) and 8.02 g of NMP (special grade) were mixed at 8,000 rpm for 30 seconds twice with HOMODISPER. Subsequently, using a thin-film rotary high-speed mixer, mixing treatment was performed at a peripheral speed of 20 m/sec for 30 seconds twice to prepare an electrode slurry (solid content concentration: 45 wt %, SiO/Gr/PVdF/AB/additive=29.60/62.90/5.0/2.0/0.5 (weight ratio)).

Comparative Example 5-1

6.03 g of silicon monoxide and 12.81 g of spheroidized natural graphite as active materials, 14.46 g of a solution of polyvinylidene fluoride in NMP (special grade) (7 wt %) as a binder, 0.41 g of acetylene black as a conduction aid and 11.30 g of NMP (special grade) were mixed at 8,000 rpm for 30 seconds twice with HOMODISPER. Subsequently, using a thin-film rotary high-speed mixer, mixing treatment was performed at a peripheral speed of 20 m/sec for 30 seconds twice to prepare an electrode slurry (solid content concentration: 45 wt %, SiO/Gr/PVdF/AB/additive=29.76/63.24/5.0/2.0/0 (weight ratio)).

[6] Production of Negative Electrode

Examples 6-1 to 6-2 and Comparative Example 6-1

The electrode slurry obtained in each of Examples 5-1 to 5-2 and Comparative Example 5-1 was uniformly applied to an electrolytic copper foil as a current collector using a doctor blade, dried at 80 °C for 30 minutes to form an active material layer, and compressed by a roll press machine to produce an electrode. The coating thickness was adjusted so that the weight per unit area of the electrode was 5.5±0.2 mg/cm$^2$. Table 5 collectively shows electrode slurries and additives used in Examples and Comparative Examples, and the composition rations of the electrode slurries. The maximum temperature during preparation of each composition is also shown.

vinylidene fluoride in NMP (special grade) (7 wt %) as a binder, 0.84 g of acetylene black as a conduction aid and 6.84 g of NMP were mixed at 8,000 rpm for 1 minute with HOMODISPER. Subsequently, using a thin-film rotary high-speed mixer, mixing treatment was performed at a peripheral speed of 20 m/sec for 30 seconds twice to produce an electrode slurry (solid content concentration: 70 wt %, NCM:PVdF:AB:additive=96:2:2:0 (weight ratio)). The obtained electrode slurry was uniformly applied to an aluminum foil (15 μm-thick, manufactured by UACJ Corporation) using a doctor blade, dried at 80 °C for 30 minutes to form an active material layer, and compressed by a roll press machine to produce a positive electrode. The coating thickness was adjusted so that the weight per unit area of the electrode was 21.3±0.3 mg/cm$^2$.

Examples 7-1 to 7-2 and Comparative Example 7-1

Four disk-shaped electrodes having a diameter of 10 mm were punched out from the positive electrode obtained in Production Example 2, the weight of the positive electrode layer (a weight obtained by subtracting the weight of electrode-non-coated portion punched out and having a diameter of 10 mm from the weight of the electrode punched out) and the thickness of the electrode layer (a thickness obtained by subtracting the thickness of the substrate from the thickness of the electrode punched out) were measured, and dried under vacuum at 120 °C for 15 hours, and the electrodes were then transferred to a dry booth.

Four disk-shaped electrodes having a diameter of 13 mm were punched out from the positive electrode obtained in each of Examples 6-1 to 6-2 and Comparative Example 6-1, the weight of the negative electrode layer (a weight obtained by subtracting the weight of electrode-non-coated portion punched out and having a diameter of 10 mm from the weight of the electrode punched out) and the thickness of the electrode layer (a thickness obtained by subtracting the thickness of the substrate from the thickness of the electrode punched out) were measured, and dried under vacuum at 120 °C for 15 hours, and the electrodes were then transferred to a dry booth.

A negative electrode was installed on a lid of a 2032 type coin cell, to which a washer and a spacer were welded, and a separator, which was punched out to a diameter of 16 mm and impregnated with a mixture of 20 g of an electrolyte solution and 0.4 g of fluoroethylene carbonate, was stacked on the negative electrode. From above, the positive electrode was stacked with the active material-coated surface down. A drop of the electrolyte solution was added, a case to which

TABLE 5

| | Electrode slurry | Additive | Composition ratio (SiO/Gr/PVdF/AB/Additive) | Maximum temperature (°C) |
|---|---|---|---|---|
| Example 6-1 | Example 5-1 | Example 1-1 | 29.73/63.17/5.0/2.0/0.1 | 59.2 |
| Example 6-2 | Example 5-2 | Example 1-1 | 29.60/62.90/5.0/2.0/0.5 | 61.6 |
| Comparative Example 6-1 | Comparative Example 5-1 | None | 29.76/63.24/5.0/2.0/0 | 59.4 |

[7] Production of Battery and Evaluation of Characteristics-2

[Production Example 2] Production of Positive Electrode

In a dry booth, 40.32 g of lithium nickel cobalt manganese oxide as an active material, 12.00 g of a solution of polya washer and a spacer were welded, and a gasket were then placed thereon, and sealing was performed with a coin cell caulking machine. Thereafter, this was left standing for 24 hours to produce four test secondary batteries of each of Examples 7-1 and 7-2 and Comparative Example 7-1.

For the test secondary battery produced, a charge and discharge test was conducted in the same manner as described above. The results are shown in Table 6.

TABLE 6

| | Negative electrode | Initial ACR after aging (Ω) Zr (C) | ACR after cycle test (Ω) Zr (C) | Initial 3C discharge capacity (mAh/g) | Cycle test discharge capacity (mAh/g) | |
|---|---|---|---|---|---|---|
| | | | | | 1st cycle | 100th cycle |
| Example 7-1 | Example 6-1 | 40.20 | 232.58 | 24.64 | 52.5 | 23.6 |
| Example 7-2 | Example 6-2 | 45.05 | 147.65 | 32.37 | 57.4 | 27.6 |
| Comparative Example 7-1 | Comparative Example 6-1 | 34.40 | 265.05 | 28.00 | 57.3 | 24.6 |

As shown in Table 6, it can be seen that the secondary battery using a negative electrode having an active material layer formed using an electrode slurry containing the secondary battery electrode additive according to the present invention has low resistance, and is excellent in cycle characteristics.

[8] Synthesis of Secondary Battery Electrode Additive-2

Example 8-1

7.32 g of phenylboronic acid, 5.47 g of D-mannitol (manufactured by Tokyo Chemical Industry Co., Ltd.) and 63.9 g of toluene were put in a flask together with a stirring bar. A Dean-Stark tube and a condenser were connected to the flask, and the flask was immersed in an oil bath set at 130 °C. The phenylboronic acid and the D-mannitol were reacted by refluxing the mixture for 4 hours while appropriately removing water and toluene accumulated in the Dean-Stark tube. The solvent was distilled off under reduced pressure from the reaction solution to obtain a boronic acid derivative of the following formula (8-5).

[Chem. 15]

(8-5)

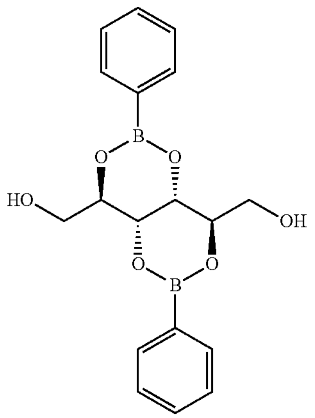

Example 8-2

1.76 g of polyvinyl alcohol (Mw 61,000, manufactured by Sigma-Aldrich, the same applies hereinafter) and 14.1 g of DMSO were put in a flask together with a stirring bar. This was heated to dissolve the polyvinyl alcohol, and 1.95 g of phenylboronic acid and 42.24 g of toluene were added. A Dean-Stark tube and a condenser were connected to the flask, and the flask was immersed in an oil bath set at 140 °C. The polyvinyl alcohol and the phenylboronic acid were reacted by refluxing the mixture for 4 hours while appropriately removing water and toluene accumulated in the Dean-Stark tube. The solvent was distilled off under reduced pressure from the reaction solution to obtain a boronic acid derivative of the following formula (9-2).

[Chem. 16]

(9-2)

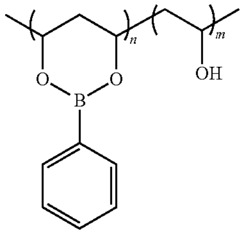

Example 8-3

3.52 g of polyvinyl alcohol and 24.6 g of NMP (special grade) were put in a flask together with a stirring bar. This was heated to dissolve polyvinyl alcohol, and a solution of 3.8 g of phenylboronic acid in 5.28 g of NMP (special grade) was added. Subsequently, a solution of 0.007 g of 1,4-phenylenediboronic acid (manufactured by Tokyo Chemical Industry Co., Ltd.) in 0.53 g of NMP (special grade) was added. A Dean-Stark tube and a condenser were connected to the flask, and the flask was immersed in an oil bath set at 140 °C. An NMP solution containing a boronic acid derivative of the following Formula (9-3) was obtained by refluxing the mixture for 4 hours while appropriately removing water and NMP accumulated in the Dean-Stark tube.

[Chem. 17]

(9-3)

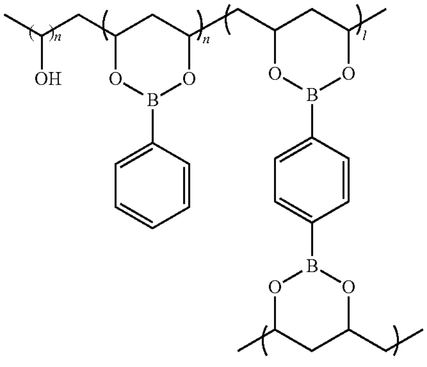

[9] Preparation of Positive Electrode Composition (Electrode Slurry)-2

Example 9-1

In a dry booth, 40.28 g of lithium nickel cobalt manganese oxide as an active material, 12.00 g of a solution of polyvinylidene fluoride in NMP (anhydrous) (manufactured by Kishida Chemical Co., Ltd.) (7 wt %) as a binder, 0.84 g of acetylene black as a conduction aid, 0.84 g of a solution of the secondary battery electrode additive synthesized in Example 1-1 in NMP (anhydrous) (5 wt %) and 6.04 g of NMP (anhydrous) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive=95.9:2:2:0.1 (weight ratio)).

Example 9-2

In a dry booth, 40.22 g of lithium nickel cobalt manganese oxide as an active material, 12.00 g of a solution of polyvinylidene fluoride in NMP (anhydrous) (7 wt %) as a binder, 0.84 g of acetylene black as a conduction aid, 2.10 g of a solution of the secondary battery electrode additive synthesized in Example 1-1 in NMP (anhydrous) (5 wt %) and 4.85 g of NMP (anhydrous) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive=95.75:2:2:0.25 (weight ratio)).

Example 9-3

In a dry booth, 40.28 g of lithium nickel cobalt manganese oxide as an active material, 12.00 g of a solution of polyvinylidene fluoride in NMP (anhydrous) (7 wt %) as a binder, 0.84 g of acetylene black as a conduction aid, 0.84 g of a solution of the secondary battery electrode additive synthesized in Example 8-1 in NMP (anhydrous) (5 wt %) and 6.04 g of NMP (anhydrous) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive=95.9:2:2:0.1 (weight ratio)).

Example 9-4

In a dry booth, 40.28 g of lithium nickel cobalt manganese oxide as an active material, 12.00 g of a solution of polyvinylidene fluoride in NMP (7 wt %) as a binder, 0.84 g of acetylene black as a conduction aid, 0.84 g of a solution of the secondary battery electrode additive synthesized in Example 8-2 in NMP (anhydrous) (5 wt %) and 6.04 g of NMP (anhydrous) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive=95.9:2:2:0.1 (weight ratio)).

Example 9-5

In a dry booth, 40.28 g of lithium nickel cobalt manganese oxide as an active material, 12.00 g of a solution of polyvinylidene fluoride in NMP (anhydrous) (7 wt %) as a binder, 0.84 g of acetylene black as a conduction aid, 0.84 g of a solution obtained by diluting the solution of the secondary battery electrode additive synthesized in Example 8-3 in NMP, to 5 wt % using NMP (anhydrous), and 6.04 g of NMP (anhydrous) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive=95.9:2:2:0.1 (weight ratio)).

Comparative Example 8-1

In a dry booth, 40.32 g of lithium nickel cobalt manganese oxide as an active material, 12.00 g of a solution of polyvinylidene fluoride in NMP (anhydrous) (7 wt %) as a binder, 0.84 g of acetylene black as a conduction aid and 6.84 g of NMP were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive=96:2:2:0 (weight ratio)).

Comparative Example 8-2

In a dry booth, 40.28 g of lithium nickel cobalt manganese oxide as an active material, 12.00 g of a solution of polyvinylidene fluoride in NMP (anhydrous) (7 wt %) as a binder, 0.84 g of acetylene black as a conduction aid, 0.042 g of acetylene black as an additive and 6.84 g of NMP (anhydrous) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive=95.9:2:2:0.1 (weight ratio)).

[10] Preparation of Positive Electrode and Evaluation of Adhesion Strength-2

Examples 10-1 to 10-5 and Comparative Examples 9-1 to 9-2

Electrodes (positive electrodes) were produced in the same manner as in Example 3-1 using the electrode slurries obtained in Examples 9-1 to 9-5 and Comparative Examples 8-1 to 8-2, respectively. The coating thickness was adjusted so that the weight per unit area of the electrode was 21.8±0.4 $mg/cm^2$. Table 7 collectively shows electrode slurries and additives used in Examples and Comparative Examples, and the composition rations of the electrode slurries.

For the electrodes produced in Examples and Comparative Examples, adhesion strength was measured by conducting a peeling test in the same manner as described above. The results are shown in Table 7. The maximum temperature during preparation of each composition is also shown.

TABLE 7

| | Electrode slurry | Additive | Composition ratio (NCM/PVdF/AB/Additive) | Maximum temperature (°C) | Adhesion strength (N/m) |
|---|---|---|---|---|---|
| Example 10-1 | Example 9-1 | Example 1-1 | 95.9/2/2/0.1 | 67.1 | 35.93 |
| Example 10-2 | Example 9-2 | Example 1-1 | 95.75/2/2/0.25 | 65.6 | 31.65 |
| Example 10-3 | Example 9-3 | Example 8-1 | 95.9/2/2/0.1 | 67.7 | 46.83 |
| Example 10-4 | Example 9-4 | Example 8-2 | 95.9/2/2/0.1 | 66.7 | 62.85 |
| Example 10-5 | Example 9-5 | Example 8-3 | 95.9/2/2/0.1 | 67.4 | 46.88 |
| Comparative Example 9-1 | Comparative Example 8-1 | None | 96/2/2/0 | 65.9 | 31.03 |
| Comparative Example 9-2 | Comparative Example 8-2 | Acetylene black | 95.9/2/2/0.1 | 67.7 | 39.53 |

[11] Production of Battery and Evaluation of Characteristics-3

[Production Example 3] Production of Negative Electrode

An electrode plate in which an active material layer containing artificial graphite as an active material and carboxymethyl cellulose (CMC) and a styrene-butadiene copolymer (SBR) as binders and having an artificial graphite: CMC:SBR ratio of 98:1:1 (weight ratio) is formed on a copper foil (thickness: 10 μm) was purchased from Hachiyama Co., Ltd. and used. The active material layer has a weight per unit area of 14.5 mg/cm$^2$ and a density of 1.45 g/cc.

Examples 11-1 to 11-5 and Comparative Examples 10-1 to 10-2

Four test secondary batteries were produced in the same manner as in Example 4-1 using each of the positive electrodes obtained in Examples 10-1 to 10-5, Comparative Examples 9-1 and 9-2 and the negative electrode of Production Example 3.

For the test secondary battery produced, a charge and discharge test was conducted in the same manner as described above. The results are shown in Table 8.

TABLE 8

| | Positive electrode | Initial ACR after aging (Ω) Zr (C) | ACR after cycle test (Ω) Zr (C) | Initial 3C discharge capacity (mAh/g) | Cycle test discharge capacity (mAh/g) 1st cycle | Cycle test discharge capacity (mAh/g) 100th cycle | Capacity maintenance rate (%) |
|---|---|---|---|---|---|---|---|
| Example 11-1 | Example 10-1 | 23.69 | 98.11 | 58.50 | 189.01 | 144.56 | 76 |
| Example 11-2 | Example 10-2 | 24.03 | 89.05 | 62.67 | 188.97 | 150.35 | 80 |
| Example 11-3 | Example 10-3 | 26.01 | 99.27 | 57.73 | 188.12 | 143.49 | 76 |
| Example 11-4 | Example 10-4 | 21.29 | 42.67 | 67.46 | 192.41 | 167.02 | 87 |
| Example 11-5 | Example 10-5 | 21.73 | 46.65 | 70.68 | 191.95 | 165.38 | 86 |
| Comparative Example 10-1 | Comparative Example 9-1 | 24.88 | 131.85 | 56.68 | 188.68 | 127.63 | 68 |
| Comparative Example 10-2 | Comparative Example 9-2 | 26.70 | 151.72 | 61.33 | 187.91 | 126.12 | 67 |

As shown in Table 8, it can be seen that the secondary battery using a positive electrode having an active material layer formed using an electrode slurry containing the secondary battery electrode additive according to the present invention is excellent in capacity, resistance and cycle characteristics.

[12] Preparation of Positive Electrode Composition (Electrode Slurry)-3

Example 12-1

In a dry booth, 40.24 g of lithium nickel cobalt manganese oxide as an active material, 12.00 g of a solution of polyvinylidene fluoride in NMP (anhydrous) (7 wt %) as a binder, 0.84 g of acetylene black as a conduction aid, 0.84 g of a solution of the secondary battery electrode additive synthesized in Example 1-1 (additive A) in NMP (anhydrous) (5 wt %), 0.84 g of a solution of polyvinylpyrrolidone (additive B) in NMP (anhydrous) and 5.24 g of NMP (anhydrous) (5 wt %) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive A:additive B=95.8:2:2:0.1:0.1 (weight ratio)).

Example 12-2

In a dry booth, 40.24 g of lithium nickel cobalt manganese oxide as an active material, 12.00 g of a solution of polyvinylidene fluoride in NMP (anhydrous) (7 wt %) as a binder, 0.84 g of acetylene black as a conduction aid, 0.84 g of a solution of the secondary battery electrode additive synthesized in Example 1-1 (additive A) in NMP (anhydrous) (5 wt %), 0.84 g of a solution of water (additive B) in NMP (anhydrous) (5 wt %) and 5.24 g of NMP (anhydrous) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive A:additive B=95.8:2:2:0.1:0.1 (weight ratio)).

Example 12-3

In a dry booth, 40.24 g of lithium nickel cobalt manganese oxide as an active material, 12.00 g of a solution of polyvinylidene fluoride in NMP (anhydrous) (7 wt %) as a binder, 0.84 g of acetylene black as a conduction aid, 0.84 g of a solution of the secondary battery electrode additive synthesized in Example 1-1 (additive A) in NMP (anhydrous) (5 wt %), 0.84 g of a solution of trimethylolethane (additive B) in NMP (anhydrous) and 5.24 g of NMP (anhydrous) (5 wt %) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive A:additive B=95.8:2:2:0.1:0.1 (weight ratio)).

Example 12-4

In a dry booth, 40.24 g of lithium nickel cobalt manganese oxide as an active material, 12.00 g of a solution of polyvinylidene fluoride in NMP (anhydrous) (7 wt %) as a binder, 0.84 g of acetylene black as a conduction aid, 0.84 g of a solution of the secondary battery electrode additive synthesized in Example 1-1 (additive A) in NMP (anhydrous) (5 wt %), 0.84 g of a solution of D-mannitol (additive B) in NMP (anhydrous) and 5.24 g of NMP (anhydrous) (5 wt %) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive A:additive B=95.8:2:2:0.1:0.1 (weight ratio)).

Example 12-5

In a dry booth, 40.24 g of lithium nickel cobalt manganese oxide as an active material, 12.00 g of a solution of polyvinylidene fluoride in NMP (7 wt %) as a binder, 0.84 g of acetylene black as a conduction aid, 0.84 g of a solution of the secondary battery electrode additive synthesized in Example 1-1 (additive A) in NMP (anhydrous) (5 wt %), 0.84 g of a solution of N-methyliminodiacetic acid (additive B) in NMP (anhydrous) (5 wt %) and 5.24 g of NMP (anhydrous) were mixed at 8,000 rpm for 1 minute with HOMODISPER. Subsequently, using a thin-film rotary high-speed mixer, mixing treatment was performed at a peripheral speed of 20 m/sec for 30 seconds twice to prepare an electrode slurry (solid content concentration: 70 wt %, NCM:PVdF:AB:additive A:additive B=95.8:2:2:0.1:0.1 (weight ratio)).

[13] Preparation of Positive Electrode and Evaluation of Adhesion Strength-3

Examples 13-1 to 13-5

Electrodes (positive electrodes) were produced in the same manner as in Example 3-1 using the electrode slurries obtained in Examples 13-1 to 13-5, respectively. The coating thickness was adjusted so that the weight per unit area of the electrode was 21.8±0.4 mg/cm$^2$. Table 9 collectively shows electrode slurries and additives used in Examples and Comparative Examples, and the composition rations of the electrode slurries.

For the electrodes produced in Examples and Comparative Examples, adhesion strength was measured by conducting a peeling test in the same manner as described above. The results are shown in Table 9. Table 9 also shows the results for the electrodes of Example 10-1 and Comparative Example 9-1 for comparison. The maximum temperature during preparation of each composition is also shown.

TABLE 9

| | Electrode slurry | Additive A | Additive B | Composition ratio (NCM/PVdF/AB/ additive A/additive B) | Maximum temperature (°C) | Adhesion strength (N/m) |
|---|---|---|---|---|---|---|
| Example 10-1 | Example 9-1 | Example 1-1 | None | 95.9/2/2/0.1/0 | 67.1 | 35.93 |
| Example 13-1 | Example 12-1 | Example 1-1 | Polyvinylpyrrolidone | 95.8/2/2/0.1/0.1 | 68.0 | 71.95 |
| Example 13-2 | Example 12-2 | Example 1-1 | Water | 95.8/2/2/0.1/0.1 | 65.3 | 45.25 |
| Example 13-3 | Example 12-3 | Example 1-1 | Trimethylolethane | 95.8/2/2/0.1/0.1 | 65.9 | 45.93 |
| Example 13-4 | Example 12-4 | Example 1-1 | D-mannitol | 95.8/2/2/0.1/0.1 | 67.3 | 46.83 |
| Example 13-5 | Example 12-5 | Example 1-1 | N-methyl-iminodiacetic acid | 95.8/2/2/0.1/0.1 | 67.8 | 36.80 |
| Comparative Example 9-1 | Comparative Example 8-1 | None | None | 96/2/2/0/0 | 65.9 | 31.03 |

[14] Production of Battery and Evaluation of Characteristics-4

Examples 14-1 to 14-5

Four test secondary batteries were produced in the same manner as in Example 4-1 using each of the positive electrodes obtained in Examples 13-1 to 13-5 and the negative electrode of Production Example 3.

For the test secondary battery produced, a charge and discharge test was conducted in the same manner as described above. The results are shown in Table 10. Table 10 also shows the results for the electrodes of Example 11-1 and Comparative Example 10-1 for comparison.

TABLE 10

| | Positive electrode | Initial ACR after aging (Ω) Zr (C) | ACR after cycle test (Ω) Zr (C) | Initial 3C discharge capacity (mAh/g) | Cycle test discharge capacity (mAh/g) 1st cycle | 100th cycle | Capacity maintenance rate (%) |
|---|---|---|---|---|---|---|---|
| Example 11-1 | Example 10-1 | 23.69 | 98.11 | 58.50 | 189.01 | 144.56 | 76 |
| Example 14-1 | Example 13-1 | 21.80 | 37.45 | 61.60 | 187.18 | 162.67 | 87 |
| Example 14-2 | Example 13-2 | 21.50 | 48.38 | 69.07 | 189.18 | 159.33 | 84 |
| Example 14-4 | Example 13-4 | 22.08 | 51.06 | 67.02 | 185.68 | 156.25 | 84 |
| Example 14-5 | Example 13-5 | 24.95 | 86.41 | 61.36 | 187.68 | 151.00 | 80 |
| Example 14-6 | Example 13-6 | 25.46 | 117.02 | 57.15 | 185.86 | 131.80 | 71 |
| Comparative Example 10-1 | Comparative Example 9-1 | 24.88 | 131.85 | 56.68 | 188.68 | 127.63 | 68 |

As shown in Table 10, it can be seen that the secondary battery using a positive electrode having an active material layer formed using an electrode slurry containing the secondary battery electrode additive according to the present invention is excellent in capacity, resistance and cycle characteristics.

The invention claimed is:

1. A secondary battery electrode additive comprising a boronic acid derivative, wherein the boronic acid derivative is a reaction product of an arylboronic acid of the following formula (1) and a reactive compound having three or more reactive groups of at least one type selected from the group consisting of a hydroxyl group, a carbonyl group, an isocyanate group, and an amino group:

(1)

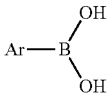

wherein Ar represents an aryl group optionally having a substituent or a heteroaryl group optionally having a substituent.

2. The secondary battery electrode additive according to claim 1, wherein Ar is a phenyl group optionally having a substituent.

3. The secondary battery electrode additive according to claim 1, wherein the arylboronic acid has the following formula (2):

(2)

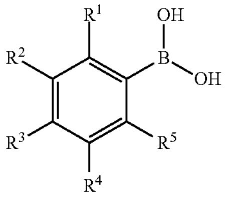

wherein $R^1$ to $R^5$ each independently represent a hydrogen atom, an alkyl group, an ester group, a glycol chain, an alkoxy group, or a hydroxyl group.

4. The secondary battery electrode additive according to claim 1, wherein the reactive compound is at least one selected from the group consisting of trimethylolmethane, trimethylolethane, trimethylolpropane, glycerin, mannitol, pentaerythritol, dipentaerythritol, citric acid, isocitric acid, oxalosuccinic acid, aconitic acid, polyvinyl alcohol and derivatives thereof, and polyvinyl alcohol copolymers and derivatives thereof.

5. The secondary battery electrode additive according to claim 1, wherein the reactive compound has three or more hydroxyl groups.

6. The secondary battery electrode additive according to claim 1, wherein the boronic acid derivative has the following formula (3):

(3)

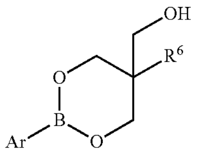

wherein Ar represents the same meaning as described above, and $R^6$ represents a hydrogen atom, a methyl group, or an ethyl group.

7. The secondary battery electrode additive according to claim 3, wherein the boronic acid derivative has the following formula (5):

(5)

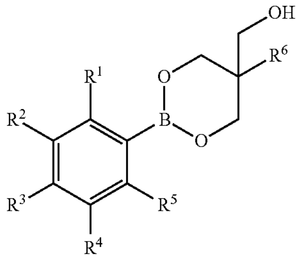

wherein $R^1$ to $R^5$ represent the same meaning as described above, and Re represents a hydrogen atom, a methyl group, or an ethyl group.

8. The secondary battery electrode additive according to claim 3, wherein the boronic acid derivative has the following formula (7):

(7)

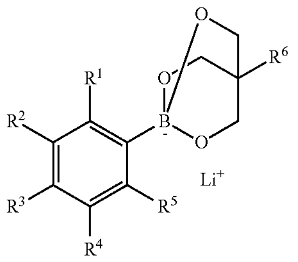

wherein $R^1$ to $R^5$ represent the same meaning as described above, and $R^6$ represents a hydrogen atom, a methyl group, or an ethyl group.

9. An electrode composition comprising the secondary battery electrode additive according to claim 1, and an active material.

10. The electrode composition according to claim 9, further comprising a second additive that is different from the secondary battery electrode additive.

11. The electrode composition according to claim 10, wherein the second additive is at least one selected from the group consisting of water, a hydroxyl group-containing compound, and a compound containing a nitrogen atom and a carbonyl structure.

12. The electrode composition according to claim 10, wherein the second additive is at least one selected from the group consisting of polyvinyl pyrrolidone, polyvinyl alcohol and derivatives thereof, and polyvinyl alcohol copolymers and derivatives thereof.

13. The electrode composition according to claim 9, wherein the active material is an oxide containing Li and Ni, and the electrode composition is a positive electrode composition.

14. The electrode composition according to claim 13, wherein the active material is a positive electrode composition of $Li_aNi_{(1-x-y)}Co_xM^1_yM^2_zX_wO_2$ ($1.00 \leq a \leq 1.50$, $0.00 \leq x \leq 0.50$, $0 \leq y \leq 0.50$, $0.000 \leq z \leq 0.020$, $0.000 \leq w \leq 0.020$, wherein $M^1$ is at least one selected from the group consisting of Mn and Al, and $M^2$ is at least one selected from the group consisting of Zr, Ti, Mg, W, and V).

15. The electrode composition according to claim 9, wherein the secondary battery electrode additive is contained at 0.01 to 10.0 wt %.

16. The electrode composition according to claim 9, wherein the active material is at least one selected from the group consisting of graphite, Si, SiO, lithium titanium oxide (LTO), and metal Li, and the electrode composition is a negative electrode composition.

17. The electrode composition according to claim 16, wherein the secondary battery electrode additive is contained at 0.02 to 10.0 wt %.

18. A secondary battery electrode comprising: a current collecting substrate; and an active material layer formed on at least one surface of the current collecting substrate, wherein the active material layer is formed of the electrode composition according to claim 9.

19. A secondary battery positive electrode comprising: a current collecting substrate; and an active material layer formed on at least one surface of the current collecting substrate, wherein the active material layer is formed of the electrode composition according to claim 13.

20. The secondary battery positive electrode according to claim 19, wherein in a secondary battery electrode after charge and discharge, an intensity ratio between an intensity of a C—F peak (686±1.25 eV) and an intensity of a LiF peak (683.5±1.25 eV) ([C—F]/[LiF]), which is determined by XPS measurement (the C—C-derived peak of C1s is standardized as 284 eV), is 3.0 or more.

21. A secondary battery negative electrode comprising: a current collecting substrate; and an active material layer formed on at least one surface of the current collecting substrate, wherein the active material layer is formed of the electrode composition according to claim 16.

22. A secondary battery comprising the secondary battery electrode according to claim 18.

23. The secondary battery according to claim 22, which is a lithium ion secondary battery.

24. The secondary battery according to claim 22, which is an all-solid-state battery.

25. A method for producing an electrode composition containing the secondary battery electrode additive according to claim 1 and an active material, wherein a maximum temperature during preparation of the composition is 60 to 200 °C.

26. A secondary battery comprising the secondary battery positive electrode according to claim 19.

27. A secondary battery comprising the secondary battery negative electrode according to claim 21.

28. A secondary battery electrode additive comprising a boronic acid derivative, wherein the boronic acid derivative is a reaction product of an arylboronic acid of the following formula (1) and a reactive compound having two or more reactive groups of at least one type selected from the group consisting of a hydroxyl group, a carbonyl group, an isocyanate group, and an amino group:

(1)

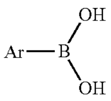

wherein Ar represents an aryl group optionally having a substituent or a heteroaryl group optionally having a substituent, and wherein the boronic acid derivative has the following formula (3) or contains a repeating unit of the following formula (4):

(3)

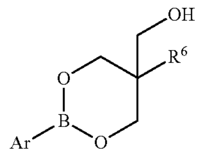

(4)

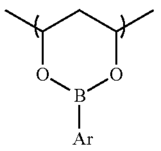

wherein Ar represents the same meaning as described above, and $R^6$ represents a hydrogen atom, a methyl group, or an ethyl group.

29. A secondary battery electrode additive comprising a boronic acid derivative, wherein the boronic acid derivative is a reaction product of an arylboronic acid of the following formula (1) and a reactive compound having two or more reactive groups of at least one type selected from the group consisting of a hydroxyl group, a carbonyl group, an isocyanate group, and an amino group:

(1)

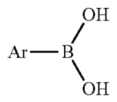

wherein Ar represents an aryl group optionally having a substituent or a heteroaryl group optionally having a substituent, wherein the arylboronic acid has the following formula (2):

(2)

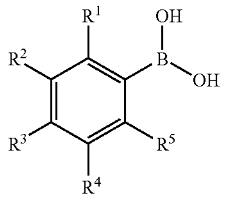

wherein $R^1$ to $R^5$ each independently represent a hydrogen atom, an alkyl group, an ester group, a glycol chain, an alkoxy group, or a hydroxyl group, and wherein the boronic acid derivative has the following formula (5) or contains a repeating unit of the following formula (6):

(5)

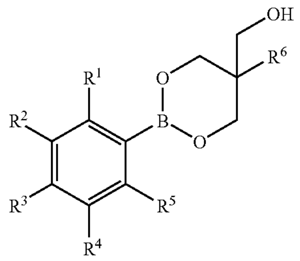

(6)

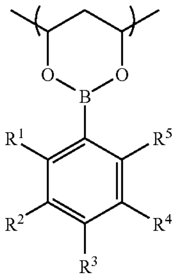

wherein $R^1$ to $R^5$ represent the same meaning as described above, and $R^6$ represents a hydrogen atom, a methyl group, or an ethyl group.

* * * * *